United States Patent
Wang et al.

(10) Patent No.: US 12,376,004 B2
(45) Date of Patent: Jul. 29, 2025

(54) COMMUNICATION METHOD AND COMMUNICATION APPARATUS

(71) Applicant: Huawei Technologies Co., Ltd., Shenzhen (CN)

(72) Inventors: Hong Wang, Beijing (CN); Bin Xu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 17/990,315

(22) Filed: Nov. 18, 2022

(65) Prior Publication Data

US 2023/0079892 A1    Mar. 16, 2023

Related U.S. Application Data

(63) Continuation of application No. PCT/CN2021/089673, filed on Apr. 25, 2021.

(30) Foreign Application Priority Data

May 19, 2020 (CN) .......................... 202010423566.0

(51) Int. Cl.
    *H04W 48/04* (2009.01)
(52) U.S. Cl.
    CPC .................................. *H04W 48/04* (2013.01)
(58) Field of Classification Search
    CPC .................................................... H04W 48/04
    See application file for complete search history.

(56) References Cited

U.S. PATENT DOCUMENTS

| | | |
|---|---|---|
| 9,220,031 B2 | 12/2015 | Feng et al. |
| 11,051,165 B2 | 6/2021 | Kiss et al. |
| 2006/0191017 A1 | 8/2006 | Hieda |
| 2013/0223369 A1 | 8/2013 | Nenner et al. |
| 2019/0245614 A1* | 8/2019 | Lucky .................. H04B 7/2041 |
| 2022/0078746 A1* | 3/2022 | Lee ...................... H04W 64/003 |
| 2022/0131603 A1* | 4/2022 | Qiao .................. H04B 7/18534 |
| 2022/0264417 A1* | 8/2022 | Zhou .................... H04B 7/2041 |

FOREIGN PATENT DOCUMENTS

| | | |
|---|---|---|
| CN | 102111847 A | 6/2011 |
| CN | 105873189 A | 8/2016 |
| CN | 105939534 A | 9/2016 |
| CN | 106572438 A | 4/2017 |

(Continued)

OTHER PUBLICATIONS

ZTE: "Extended Access Barring for delay tolerant devices", 3GPP Draft; R2-112864, May 3, 2011, XP050495266, total 10 pages.

(Continued)

*Primary Examiner* — Justin Y Lee
(74) *Attorney, Agent, or Firm* — Slater Matsil, LLP

(57) ABSTRACT

This application provides a communication method and a communication apparatus. The method includes: determining a first message, where the first message indicates a correspondence between N pieces of access control information and M pieces of geographic area information, the access control information is used by a terminal device to determine whether to send an access request message, and N and M are positive integers; and sending the first message to the terminal device.

20 Claims, 15 Drawing Sheets

(56) References Cited

FOREIGN PATENT DOCUMENTS

CN          108307413 A     7/2018
WO      2019061204 A1   4/2019

OTHER PUBLICATIONS

ZTE et al: "Consideration on the signaling of barring parameters", 3GPP Draft; R2-1804450, Apr. 14, 2018, XP051428187, total 7 pages.

"Initial Random Access Procedure in Non-Terrestrial Networks (NTN)," Source: Nomor Research GmbH, Thales, Document for: Discussion, Decision, Agenda Item: 11.6.3.1, MAC Enhancements, Study Item: FS_NR_NTN_solutions: Study on solutions for NR to support non-terrestrial networks (NTN), 3GPP TSG-RAN WG2 Meeting # 104, R2-1818510, Spokane, USA, Nov. 12-16, 2018, 6 pages.

"New Study WID on NB-IoT/eTMC support for NTN," Source: MediaTek Inc., Document for: Approval, Agenda Item: xxx, 3GPP TSG RAN Meeting #86, RP-193235 (revision of xx-yyxxxx), Sitges, Spain, Dec. 9-31, 2019, 4 pages.

\* cited by examiner

COMMUNICATION METHOD AND COMMUNICATION APPARATUS

CROSS-REFERENCE TO RELATED APPLICATIONS

This application is a continuation of International Application No. PCT/CN2021/089673, filed on Apr. 25, 2021, which claims priority to Chinese Patent Application No. 202010423566.0, filed on May 19, 2020. The disclosures of the aforementioned applications are hereby incorporated by reference in their entireties.

TECHNICAL FIELD

This application relates to the communications field, and more specifically, to a communication method and a communication apparatus.

BACKGROUND

In the communications field, a terminal device accesses a network for information transmission. When a large quantity of terminal devices access the network, network congestion may occur. To avoid network congestion, a network device generally broadcasts access control information, so that some of the terminal devices access the network. When fewer terminal devices access the network, the network device updates the access control information, so that more terminal devices access the network.

For example, in non-terrestrial networks (NTN) communication, a network device is on board of a flight vehicle. When signal coverage of the network device is in a densely populated city, a large quantity of terminal devices access a network. When signal coverage of the network device is in an ocean or a desert, a smaller quantity of terminal devices access the network. As a result, the network device needs to frequently update access control information. When updating the access control information, the network device needs to send a paging message in advance to notify terminal devices within the signal coverage of the network device that the access control information changes. Because the network device frequently updates the access control information, power consumption of the network device is increased. In addition, the terminal device needs to frequently obtain updated access control information, accordingly increasing power consumption of the terminal device.

SUMMARY

This application provides a communication method and a communication apparatus, to avoid that a network device frequently updates access control information, so as to reduce signaling consumption in a communication process, improve communication efficiency and resource utilization of a communication system, and reduce power consumption of the network device and a terminal device.

According to a first aspect, a communication method is provided. The method includes: determining a first message, where the first message indicates a correspondence between N pieces of access control information and M pieces of geographic area information, the access control information is used by a terminal device to determine whether to send an access request message, and N and M are positive integers; and sending the first message to the terminal device.

In this technical solution, a network device determines a first message indicating a correspondence between access control information and geographic area information, and sends the first message to the terminal device. Using this technical solution avoids frequent changes of the access control information due to location changes of the network device, reduces signaling consumption in a communication process, and improves communication efficiency and resource utilization of a communication system while reducing power consumption of the network device and the terminal device.

With reference to the first aspect, in some implementations of the first aspect, the first message includes configuration information of the N pieces of access control information and configuration information of the M pieces of geographic area information; or the first message includes N access control information indexes and M geographic area information indexes. The N access control information indexes one-to-one correspond to the N pieces of access control information, and the M geographic area information indexes one-to-one correspond to the M pieces of geographic area information.

In this technical solution, the first message includes the configuration information of the N pieces of access control information and the configuration information of the M pieces of geographic area information. The terminal device may select corresponding access control information based on geographic area information that includes a geographic location of the terminal device, to avoid that the network device frequently updates received access control information. The first message includes the N access control information indexes and the M geographic area information indexes. The terminal device may select the corresponding geographic area information based on the geographic area information index, to select corresponding access control information.

With reference to the first aspect, in some implementations of the first aspect, before the sending the first message to the terminal device, the method further includes: sending a second message to the terminal device. The second message is for configuring the N pieces of access control information and the M pieces of geographic area information, and/or the second message includes N access control information indexes and M geographic area information indexes. The N access control information indexes one-to-one correspond to the N pieces of access control information, and the M geographic area information indexes one-to-one correspond to the M pieces of geographic area information.

In this technical solution, the second message is for configuring the N pieces of access control information and the M pieces of geographic area information, and includes the N access control information indexes and the M geographic area information indexes. When a plurality of pieces of geographic area information correspond to one piece of access control information, the network device needs to send the access control information only once, and the terminal device may select corresponding access control information based on the access control information index, to reduce a data amount in the second message and reduce signaling consumption.

With reference to the first aspect, in some implementations of the first aspect, the geographic area information includes a first latitude and a second latitude; a first longitude and a second longitude; a first latitude, a second latitude, a first longitude, and a second longitude; a first longitude and a first distance; or a first latitude and a second distance.

This technical solution helps the terminal device determine geographic area information.

With reference to the first aspect, in some implementations of the first aspect, the geographic area information includes a third latitude, a third longitude, and a first radius, where the first radius is centered around an intersection point of the third latitude and the third longitude.

With reference to the first aspect, in some implementations of the first aspect, the geographic area information indicates at least one cell.

In this technical solution, the geographic area information indicates at least one cell. This solution helps the network device implement precise access control on the terminal device in the cell.

According to a second aspect, a communication method is provided. The method includes: determining a third message, where the third message indicates a correspondence between N pieces of access control information and M pieces of time information, the access control information is used by a terminal device to determine whether to send an access request message, and N and M are positive integers; and sending the third message to the terminal device.

In this technical solution, the network device determines the third message indicating the correspondence between access control information and time information, and sends the third message to the terminal device. Using this technical solution avoids frequent changes of the access control information due to location changes of the network device, reduces signaling interworking in a communication process, and improves communication efficiency and resource utilization of a communication system while reducing power consumption of the network device and the terminal device.

With reference to the second aspect, in some implementations of the second aspect, the third message includes configuration information of the N pieces of access control information and configuration information of the M pieces of time information; or the third message includes N access control information indexes and M time information indexes. The N access control information indexes one-to-one correspond to the N pieces of access control information, and the M time information indexes one-to-one correspond to the M pieces of time information.

In this technical solution, the third message includes the configuration information of the N pieces of access control information and the configuration information of the M pieces of time information. The terminal device may select corresponding access control information based on time information that includes a time point of the terminal device, to avoid that the network device frequently updates received access control information. The third message includes the N access control information indexes and the M time information indexes. The terminal device may select the corresponding time information based on the time information index, to select corresponding access control information.

With reference to the second aspect, in some implementations of the second aspect, before the sending the third message to the terminal device, the method further includes: sending a fourth message to the terminal device, where the fourth message is for configuring the N pieces of access control information and the M pieces of geographic area information, and/or the fourth message includes N access control information indexes and M time information indexes. The N access control information indexes one-to-one correspond to the N pieces of access control information, and the M time information indexes one-to-one correspond to the M pieces of time information.

In this technical solution, the fourth message is for configuring the N pieces of access control information and the M pieces of time information, and includes the N access control information indexes and the M time information indexes. When a plurality of pieces of time information correspond to one piece of access control information, the network device needs to send the access control information only once, and the terminal device may select corresponding access control information based on the access control information index, to reduce a data amount in the fourth message and reduce signaling consumption.

With reference to the second aspect, in some implementations of the second aspect, the time information includes at least one moment, and the at least one moment indicates at least one time period; or the time information includes a first moment and first duration.

With reference to the second aspect, in some implementations of the second aspect, the method further includes: sending reference information to the terminal device, where the reference information is for determining current time information; or sending first time information to the terminal device, where the first time information indicates current time information.

In this technical solution, the network device sends the reference information to the terminal device. This helps the terminal device determine the current time information, or the network device directly sends, to the terminal device, the first time information indicating the current time information, so that the terminal device can determine target access control information based on the current time information.

According to a third aspect, a communication method is provided. The method includes: receiving a first message, where the first message indicates a correspondence between N pieces of access control information and M pieces of geographic area information, the access control information is used by a terminal device to determine whether to send an access request message, and N and M are positive integers; and determining, based on a current geographic location and the first message, whether to send a first access request message.

In this technical solution, the terminal device may determine, based on a geographic location at which the terminal device is currently located and the received first message, whether to send the first access request message to a network device, to avoid frequently receiving a system message that is broadcast by the network device, reduce signaling consumption, and reduce power consumption of the terminal device.

With reference to the third aspect, in some implementations of the third aspect, the first message includes configuration information of the N pieces of access control information and configuration information of the M pieces of geographic area information; or the first message includes N access control information indexes and M geographic area information indexes. The N access control information indexes one-to-one correspond to the N pieces of access control information, and the M geographic area information indexes one-to-one correspond to the M pieces of geographic area information.

In this technical solution, the first message includes the configuration information of the N pieces of access control information and the configuration information of the M pieces of geographic area information. The terminal device may select, based on a geographic location at which the terminal device is currently located, geographic area information that includes the geographic location of the terminal device, to select corresponding access control information.

This avoids frequent receiving of paging messages updated by using system messages that are broadcast by the network device, and reduces power consumption of the terminal device.

With reference to the third aspect, in some implementations of the third aspect, before the receiving a first message, the method further includes: receiving a second message, where the second message is for configuring the N pieces of access control information and the M pieces of geographic area information, and/or the second message includes N access control information indexes and M geographic area information indexes. The N access control information indexes one-to-one correspond to the N pieces of access control information, and the M geographic area information indexes one-to-one correspond to the M pieces of geographic area information.

In this technical solution, the second message is for configuring the N pieces of the access control information and the M pieces of geographic area information, and includes the N access control information indexes and the M geographic area information indexes. When a plurality of pieces of geographic area information correspond to one piece of access control information, the network device needs to send the access control information only once, and the terminal device may select corresponding access control information based on the access control information index, to reduce a data amount in the second message and reduce signaling consumption.

With reference to the third aspect, in some implementations of the third aspect, the method further includes: determining, based on the current geographic location, whether target geographic area information exists in the M pieces of geographic area information.

In this technical solution, the terminal device may determine, based on the current geographic location, whether the target geographic area information that includes the geographic location of the terminal device exists in the M pieces of geographic area information.

With reference to the third aspect, in some implementations of the third aspect, the determining, based on a current geographic location and the first message, whether to send a first access request message includes: determining, based on the target geographic area information and the first message, target access control information corresponding to the target geographic area information; and determining, based on the target access control information, whether to send the first access request message.

In this technical solution, the terminal device determines, from the M pieces of geographic area information, geographic area information that includes the geographic location of the terminal device exists, and selects corresponding target access control information based on the geographic area information, to determine whether to send the first access request message to the network device.

With reference to the third aspect, in some implementations of the third aspect, the determining, based on a current geographic location and the first message, whether to send a first access request message includes: if a geographic location of the terminal device does not exist in a geographic area indicated by the M pieces of geographic area information, determining to send the first access request message.

Optionally, the determining, based on a current geographic location and the first message, whether to send a first access request message includes: if a geographic location of the terminal device does not exist in a geographic area indicated by the M pieces of geographic area information, determining to prohibit sending the first access request message.

In this technical solution, if the terminal device determines, from a geographic location indicated by the M pieces of geographic area information, that the geographic location of the terminal device is not included, the terminal device determines to send or prohibit sending the first access request message to the network device, to reduce signaling overheads of the terminal device and improve access control efficiency.

With reference to the third aspect, in some implementations of the third aspect, the geographic area information includes a first latitude and a second latitude; a first longitude and a second longitude; a first latitude, a second latitude, a first longitude, and a second longitude; a first longitude and a first distance; or a first latitude and a second distance.

With reference to the third aspect, in some implementations of the third aspect, the geographic area information includes a third latitude, a third longitude, and a first radius, where the first radius is centered around an intersection point of the third latitude and the third longitude.

With reference to the third aspect, in some implementations of the third aspect, the geographic area information indicates at least one cell.

In this technical solution, when the geographic area includes one or more cell indexes, to be specific, the access control information is associated with the one or more cell indexes, precise access control can be implemented on the terminal device in the cell.

According to a fourth aspect, a communication method is provided. The method includes: receiving a third message, where the third message indicates a correspondence between N pieces of access control information and M pieces of time information, the access control information is used by a terminal device to determine whether to send an access request message, and N and M are positive integers; and determining, based on a current time point and the third message, whether to send a second access request message.

In this technical solution, the terminal device may determine, based on the current time point and the received third message, whether to send a first access request message to a network device, to avoid frequently receiving a system message that is broadcast by the network device and reduce power consumption of the terminal device.

With reference to the fourth aspect, in some implementations of the fourth aspect, the third message includes configuration information of the N pieces of access control information and configuration information of the M pieces of time information; or the third message includes N access control information indexes and M time information indexes. The N access control information indexes one-to-one correspond to the N pieces of access control information, and the M time information indexes one-to-one correspond to the M pieces of time information.

In this technical solution, the third message includes the configuration information of the N pieces of access control information and the configuration information of the M pieces of time information. The terminal device may select, based on a current time point, time information that includes a time point of the terminal device, to select corresponding access control information. This avoids frequent receiving of paging messages updated by using system messages that are broadcast by the network device, and reduces power consumption of the terminal device.

With reference to the fourth aspect, in some implementations of the fourth aspect, before the receiving a third message, the method further includes: receiving a fourth message, where the fourth message is for configuring the N pieces of access control information and the M pieces of time information, and/or the fourth message includes N access control information indexes and M time information indexes. The N access control information indexes one-to-one correspond to the N pieces of access control information, and the M time information indexes one-to-one correspond to the M pieces of time information.

With reference to the fourth aspect, in some implementations of the fourth aspect, the method further includes: determining, based on the current time point, whether current time information exists in the M pieces of time information.

In this technical solution, the terminal device may determine, based on the current time point, whether the current time information that includes a time point of the terminal device exists in the M pieces of time information.

With reference to the fourth aspect, in some implementations of the fourth aspect, the determining, based on a current time point and the third message, whether to send a second access request message includes: determining, based on the current time information and the third message, target access control information corresponding to the current time information; and determining, based on the target access control information, whether to send the second access request message.

In this technical solution, the terminal device determines, from M pieces of time information, that the current time information that includes a time point of the terminal device exists, and selects corresponding target access control information based on the time information, to determine whether to send a first access request message to the network device.

With reference to the fourth aspect, in some implementations of the fourth aspect, the determining, based on a current time point and the third message, whether to send a second access request message includes: if a time point of the terminal device does not exist in duration indicated by the M pieces of time information, determining to send the second access request message.

Optionally, the determining, based on a current time point and the third message, whether to send a second access request message includes: if a time point of the terminal device does not exist in duration indicated by the M pieces of time information, determining to prohibit sending the second access request message.

In this technical solution, if the terminal device determines, from a geographic area indicated by the M pieces of geographic area information, that a geographic location of the terminal device is not included, the terminal device determines to send or prohibit sending a first access request message to the network device, to reduce signaling overheads of the terminal device and improve access control efficiency.

With reference to the fourth aspect, in some implementations of the fourth aspect, the time information includes at least one moment, and the at least one moment indicates at least one time period; or the time information includes a first moment and first duration.

With reference to the fourth aspect, in some implementations of the fourth aspect, the method further includes: receiving reference information, where the reference information is for determining the current time information; or receiving first time information, where the first time information indicates the current time information.

According to a fifth aspect, a communication apparatus is provided. The apparatus includes: a processing unit, configured to determine a first message, where the first message indicates a correspondence between N pieces of access control information and M pieces of geographic area information, the access control information is used by a terminal device to determine whether to send an access request message, and N and M are positive integers; and a transceiver unit, configured to send the first message to the terminal device.

With reference to the fifth aspect, in some implementations of the fifth aspect, the first message includes configuration information of the N pieces of access control information and configuration information of the M pieces of geographic area information; or the first message includes N access control information indexes and M geographic area information indexes. The N access control information indexes one-to-one correspond to the N pieces of access control information, and the M geographic area information indexes one-to-one correspond to the M pieces of geographic area information.

With reference to the fifth aspect, in some implementations of the fifth aspect, before sending the first message to the terminal device, the transceiver unit is further configured to send a second message to the terminal device. The second message is for configuring the N pieces of access control information and the M pieces of geographic area information, and/or the second message includes N access control information indexes and M geographic area information indexes. The N access control information indexes one-to-one correspond to the N pieces of access control information, and the M geographic area information indexes one-to-one correspond to the M pieces of geographic area information.

With reference to the fifth aspect, in some implementations of the fifth aspect, the geographic area information includes a first latitude and a second latitude; a first longitude and a second longitude; a first latitude, a second latitude, a first longitude, and a second longitude; a first longitude and a first distance; or a first latitude and a second distance.

With reference to the fifth aspect, in some implementations of the fifth aspect, the geographic area information includes a third latitude, a third longitude, and a first radius, where the first radius is centered around an intersection point of the third latitude and the third longitude.

With reference to the fifth aspect, in some implementations of the fifth aspect, the geographic area information indicates at least one cell.

According to a sixth aspect, a communication apparatus is provided. The apparatus includes: a processing unit, configured to determine a third message, where the third message indicates a correspondence between N pieces of access control information and M pieces of time information, the access control information is used by a terminal device to determine whether to send an access request message, and N and M are positive integers; and a transceiver unit, configured to send the third message to the terminal device.

With reference to the sixth aspect, in some implementations of the sixth aspect, the third message includes configuration information of the N pieces of access control information and configuration information of the M pieces of time information; or the third message includes N access control information indexes and M time information indexes. The N access control information indexes one-to-one correspond to the N pieces of access control information, and the M time information indexes one-to-one correspond to the M pieces of time information.

With reference to the sixth aspect, in some implementations of the sixth aspect, before sending the third message to the terminal device, the transceiver unit is further configured to send a fourth message to the terminal device, where the fourth message is for configuring the N pieces of access control information and the M pieces of geographic area information, and/or the fourth message includes N access control information indexes and M time information indexes. The N access control information indexes one-to-one correspond to the N pieces of access control information, and the M time information indexes one-to-one correspond to the M pieces of time information.

With reference to the sixth aspect, in some implementations of the sixth aspect, the time information includes at least one moment, and the at least one moment indicates at least one time period; or the time information includes a first moment and first duration.

With reference to the sixth aspect, in some implementations of the sixth aspect, the transceiver unit is further configured to send reference information to the terminal device, where the reference information is for determining current time information; or send first time information to the terminal device, where the first time information indicates current time information.

According to a seventh aspect, a communication apparatus is provided. The apparatus includes: a transceiver unit, configured to receive a first message, where the first message indicates a correspondence between N pieces of access control information and M pieces of geographic area information, the access control information is used by a terminal device to determine whether to send an access request message, and N and M are positive integers; and a processing unit, configured to determine, based on a current geographic location and the first message, whether to send a first access request message.

With reference to the seventh aspect, in some implementations of the seventh aspect, the first message includes configuration information of the N pieces of access control information and configuration information of the M pieces of geographic area information; or the first message includes N access control information indexes and M geographic area information indexes. The N access control information indexes one-to-one correspond to the N pieces of access control information, and the M geographic area information indexes one-to-one correspond to the M pieces of geographic area information.

With reference to the seventh aspect, in some implementations of the seventh aspect, before receiving the first message, the transceiver unit is further configured to receive a second message, where the second message is for configuring the N pieces of access control information and the M pieces of geographic area information, and/or the second message includes N access control information indexes and M geographic area information indexes. The N access control information indexes one-to-one correspond to the N pieces of access control information, and the M geographic area information indexes one-to-one correspond to the M pieces of geographic area information.

With reference to the seventh aspect, in some implementations of the seventh aspect, the processing unit is further configured to determine, based on the current geographic location, whether target geographic area information exists in the M pieces of geographic area information.

With reference to the seventh aspect, in some implementations of the seventh aspect, the processing unit is specifically configured to: determine, based on the target geographic area information and the first message, target access control information corresponding to the target geographic area information; and determine, based on the target access control information, whether to send the first access request message.

With reference to the seventh aspect, in some implementations of the seventh aspect, the processing unit is specifically configured to: if a geographic location of the terminal device does not exist in a geographic area indicated by the M pieces of geographic area information, determine to send the first access request message.

With reference to the seventh aspect, in some implementations of the seventh aspect, the geographic area information includes a first latitude and a second latitude; a first longitude and a second longitude; a first latitude, a second latitude, a first longitude, and a second longitude; a first longitude and a first distance; or a first latitude and a second distance.

With reference to the seventh aspect, in some implementations of the seventh aspect, the geographic area information includes a third latitude, a third longitude, and a first radius, where the first radius is centered around an intersection point of the third latitude and the third longitude.

With reference to the seventh aspect, in some implementations of the seventh aspect, the geographic area information indicates at least one cell.

According to an eighth aspect, a communication apparatus is provided. The apparatus includes: a transceiver unit, configured to receive a third message, where the third message indicates a correspondence between N pieces of access control information and M pieces of time information, the access control information is used by a terminal device to determine whether to send an access request message, and N and M are positive integers; and a processing unit, configured to determine, based on a current time point and the third message, whether to send a second access request message.

With reference to the eighth aspect, in some implementations of the eighth aspect, the third message includes configuration information of the N pieces of access control information and configuration information of the M pieces of time information; or the third message includes N access control information indexes and M time information indexes. The N access control information indexes one-to-one correspond to the N pieces of access control information, and the M time information indexes one-to-one correspond to the M pieces of time information.

With reference to the eighth aspect, in some implementations of the eighth aspect, before receiving the third message, the transceiver unit is further configured to receive a fourth message, where the fourth message is for configuring the N pieces of access control information and the M pieces of time information, and/or the fourth message includes N access control information indexes and M time information indexes. The N access control information indexes one-to-one correspond to the N pieces of access control information, and the M time information indexes one-to-one correspond to the M pieces of time information.

With reference to the eighth aspect, in some implementations of the eighth aspect, the processing unit is further configured to determine, based on the current time point, whether current time information exists in the M pieces of time information.

With reference to the eighth aspect, in some implementations of the eighth aspect, the processing unit is specifically configured to: determine, based on the current time information and the third message, target access control information corresponding to the current time information; and determine, based on the target access control information, whether to send the second access request message.

With reference to the eighth aspect, in some implementations of the eighth aspect, the processing unit is specifically configured to: if a time point of the terminal device does not exist in duration indicated by the M pieces of time information, determine to send the second access request message.

With reference to the eighth aspect, in some implementations of the eighth aspect, the time information includes at least one moment, and the at least one moment indicates at least one time period; or the time information includes a first moment and first duration.

With reference to the eighth aspect, in some implementations of the eighth aspect, the transceiver unit is further configured to receive reference information, where the reference information is for determining the current time information; or receive first time information, where the first time information indicates the current time information.

According to a ninth aspect, a communication apparatus is provided, including at least one processor and a communication interface, where the communication interface is connected to the at least one processor, the communication interface is configured to obtain a program or instructions. When the program or the instructions is/are executed by the processor, the communication method according to the first aspect or the second aspect is implemented.

Optionally, the communication apparatus further includes a memory, configured to store a computer program. The processor is configured to invoke the computer program from the memory and run the computer program, so that the communication apparatus performs the communication method according to the first aspect or the second aspect.

According to a tenth aspect, a communication apparatus is provided, including at least one processor and a communication interface. The communication interface is connected to the at least one processor, the communication interface is configured to obtain a program or instructions. When the program or the instructions is/are executed by the processor, the communication method according to the third aspect or the fourth aspect is implemented.

Optionally, the communication apparatus further includes a memory, configured to store a computer program. The processor is configured to invoke the computer program from the memory and run the computer program, so that the communication apparatus performs the communication method according to the third aspect or the fourth aspect.

According to an eleventh aspect, a chip is provided, including: a processor, configured to invoke a computer program from a memory and run the computer program, so that a device on which the chip is installed performs the communication method according to the first aspect or the second aspect.

According to a twelfth aspect, a chip is provided. A processor is configured to invoke a computer program from a memory and run the computer program, so that a device on which the chip is installed performs the communication method according to the third aspect or the fourth aspect.

According to a thirteenth aspect, a computer-readable storage medium is provided, configured to store a computer program. The computer program enables a computer to perform the communication method according to the first aspect or the second aspect.

According to a fourteenth aspect, a computer-readable storage medium is provided, configured to store a computer program. The computer program enables a computer to perform the communication method according to the third aspect or the fourth aspect.

According to a fifteenth aspect, a communication system is provided, including the communication apparatuses in the fifth aspect and the sixth aspect, and the communication apparatuses in the seventh aspect and the eighth aspect; or the communication system includes the communication apparatuses in the ninth aspect and the tenth aspect.

DETAILED DESCRIPTION OF ILLUSTRATIVE EMBODIMENTS

Figure 1:
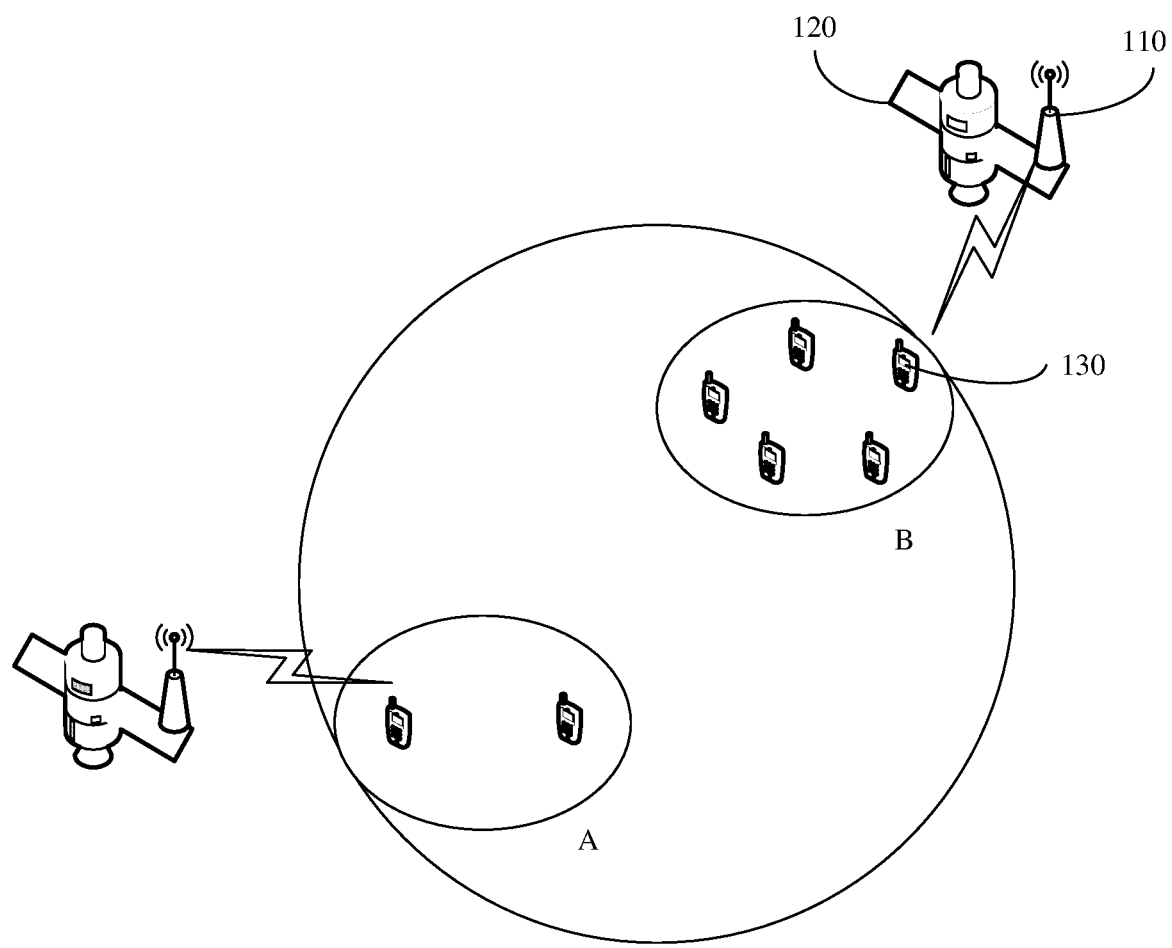
FIG. 1 is a schematic diagram of an application scenario according to an embodiment of this application.

The following describes technical solutions of this application with reference to accompanying drawings.

The technical solutions of embodiments of this application may be applied to various communication systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, or a new radio (NR) system.

A terminal device in embodiments of this application may also be referred to as user equipment, an access terminal, a subscriber unit, a subscriber station, a mobile station, a remote station, a remote terminal, a mobile device, a user terminal, a terminal, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in embodiments of this application.

By way of example, and not limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on a body or integrated into clothes or an accessory of a user. The wearable device is not merely a hardware device, but implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device in embodiments of this application may alternatively be a terminal device in an internet of things (IoT) system. IoT is an important part of future information technology development. A main technical feature of the IoT is to connect an object to a network by using a communication technology, to implement an intelligent network for human-machine interconnection and thing-thing interconnection.

A network device in embodiments of this application may be a device configured to communicate with the terminal device. The network device may be a base transceiver station (BTS) in global system for mobile communications (GSM) or code division multiple access (CDMA), a NodeB (NB) in a wideband code division multiple access (WCDMA) system, an evolved NodeB (eNB or eNodeB) in an LTE system, or a radio controller in a cloud radio access network (C-RAN) scenario. Alternatively, the network device may be a relay node, an access point, a vehicle-mounted device, a network device in a future 5G network, a network device in a future evolved PLMN, or the like. This is not limited in embodiments of this application.

FIG. 1 is a schematic diagram of an application scenario according to an embodiment of this application. As shown in FIG. 1, in a communication system in which a non-terrestrial network device communicates with a terminal device, for example, the communication system 100 includes at least a network device no and a terminal device 130. The network device no may be on board of a flight vehicle, and the flight vehicle may be a satellite, an airplane, a hot air balloon, or the like. A range covered by a signal transmitted by the network device no is A or B, and a plurality of terminal devices 130 in A or B may complete communication via the network device no. The area A represents an area having a smaller quantity of terminal devices 130, for example, an ocean, a mountainous area, or a desert. The area B represents an area having a larger quantity of terminal devices 130, for example, a densely populated city or scenic spot on land. In the area B, because a large quantity of terminal devices 130 need to access a network, to avoid possible network congestion, the network device no generally broadcasts access control information, so that some of the terminal devices 130 access the network. When the network device no flies over the area A in which there are fewer terminal devices 130 for accessing the network, the network device no may update the access control information by updating a system message, so that more terminal devices 130 can access the network.

In the communication system in which a terrestrial network device communicates with a terminal device, because a location of the network device is fixed, and a quantity of terminal devices within signal coverage of the network device is also fixed, frequency at which the network device updates access control information by updating a system message is accordingly low.

However, in the communication system in which the non-terrestrial network device communicates with the terminal device shown in FIG. 1, the network device no runs around the earth. Especially when an orbit of the network device is low, the network device runs at a high speed around the earth. For example, in a near-ground orbit, it takes only less than two hours for the network device no to run around the earth. Because the network device no runs at a high speed, the network device no frequently passes through the areas A and B, where the quantity of terminal devices 130 in the area A differs greatly from the quantity of terminal devices in the area B. Therefore, the network device no needs to frequently update an access control parameter in the system message. When updating the system message, the network device no needs to send a paging message in advance to notify the terminal device 130 within the signal coverage of the network device no that the system message changes, so that the terminal device 130 obtains an updated system message. Because the network device no needs to frequently update the system message, the network device no frequently sends the paging message carrying a system message change indication, increasing power consumption of the network device no. In addition, the terminal device 130 needs to frequently obtain updated access control information, increasing power consumption of the terminal device 130.

In embodiments of this application, the network device no sends, to the terminal device 130, one or more access control parameter sets (namely, the access control information) associated with geographic area information or time information. The terminal device 130 selects corresponding access control information based on a geographic location or a time point of the terminal device 130, and determines, based on the selected access control information, whether to send an access request message. In embodiments of this application, it is avoided frequent updating of the access control parameter due to location changes of the network device 110. This reduces signaling interworking in a communication process, and improves communication efficiency and resource utilization of the communication system while reducing power consumption of the network device 110 and power consumption of the terminal device 130.

The following describes the technical solutions of the communication method in embodiments of this application with reference to specific embodiments.

It should be understood that, in embodiments of this application, access control information may also be referred to as an access control parameter set, geographic area information may also be referred to as geographic location information, time information may also be referred to as time period information, an index may also be referred to as an identifier, sending of an access request message may also be referred to as an access attempt, and association may also be understood as a correspondence. This is not limited.

Figure 2:
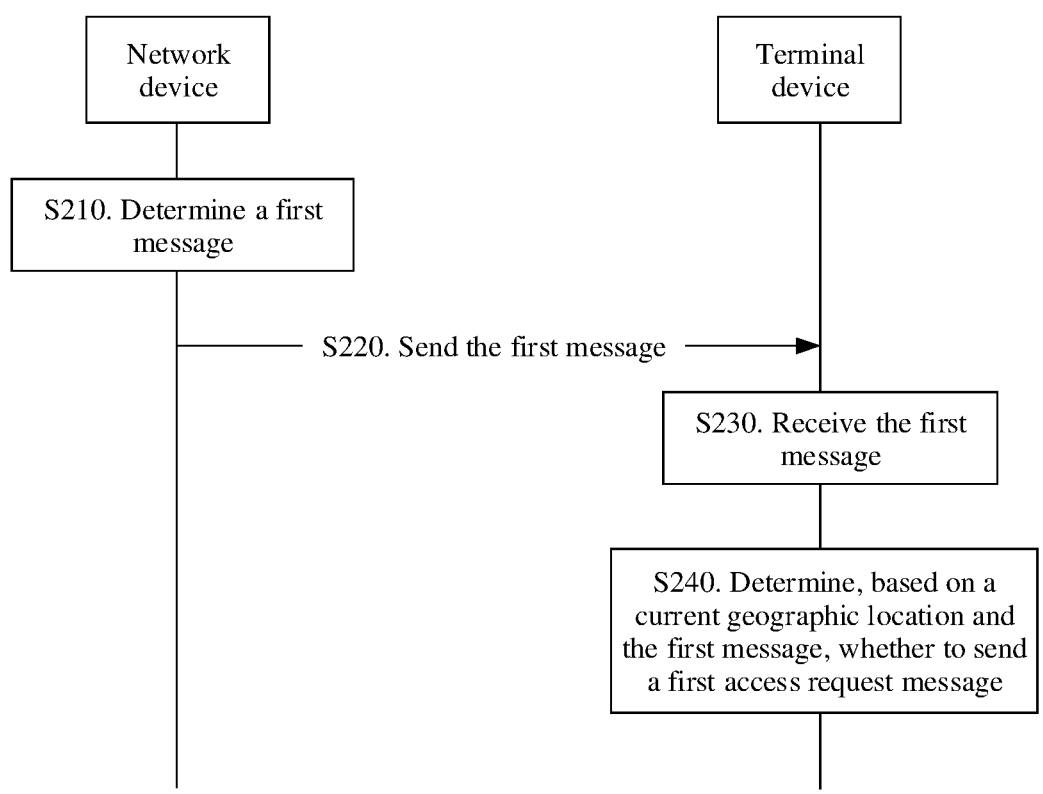
FIG. 2 is a schematic flowchart of a communication method according to an embodiment of this application.

FIG. 2 is a schematic interaction diagram of a communication method according to an embodiment of this application. As shown in FIG. 2, the method may include step S210 to step S240.

S210. Determine a first message, where the first message indicates a correspondence between N pieces of access control information and M pieces of geographic area information, the access control information is used by a terminal device to determine whether to send an access request message, and N and M are positive integers.

The access control information is used by the terminal device to determine whether to send the access request message. The access control information may further include a general access control parameter or a dedicated access control parameter. The general access control parameter is used for access control of terminal devices in all PLMNs, and the dedicated access control parameter is used for access control of a terminal device in a specific PLMN.

The geographic area information may also be referred to as geographic location information, and indicates one or more geographic areas (geographic locations).

The correspondence may be that one piece of geographic area information is associated with or corresponds to one piece of access control information, or a plurality of pieces of geographic area information are associated with or correspond to one piece of access control information.

Optionally, the first message includes configuration information of the N pieces of access control information and configuration information of the M pieces of geographic area information, or the configuration information of the N pieces of access control information and the configuration information of the M pieces of geographic area information are carried in the first message.

The configuration information of the N pieces of access control information is for configuring the N pieces of access control information, and the configuration information of the M pieces of geographic area information is for configuring the M pieces of geographic area information.

For example, the configuration information may be for configuring the N pieces of access control information and the M pieces of geographic area information, and the correspondence between the N pieces of access control information and the M pieces of geographic area information.

Content specifically included in the first message may be implemented in the following manners.

Manner 1: Optionally, the first message includes N access control information indexes and M geographic area information indexes, where the N access control information indexes one-to-one correspond to the N pieces of access control information, and the M geographic area information indexes one-to-one correspond to the M pieces of geographic area information.

In this technical solution, the access control information index one-to-one corresponds to the geographic area information index, or a plurality of geographic area information indexes correspond to one access control information index.

Manner 2: Optionally, the first message includes the N pieces of access control information and M geographic area information indexes, and the M geographic area information indexes one-to-one correspond to the M pieces of geographic area information.

In this technical solution, the access control information one-to-one corresponds to the geographic area information indexes, or a plurality of geographic area information indexes correspond to one piece of access control information.

Manner 3: Optionally, the first message includes N access control information indexes and the M pieces of geographic area information, and the N access control information indexes one-to-one correspond to the N pieces of access control information.

In this technical solution, the access control information index one-to-one corresponds to the geographic area information, or a plurality of pieces of geographic area information correspond to one access control information index.

Optionally, the geographic area information may include latitude information. For example, the latitude information may be a first latitude and a second latitude. The first latitude and the second latitude are used by the terminal device to determine a range of a geographic area. For example, the first latitude and the second latitude indicate an upper boundary and a lower boundary of the geographic area. The first latitude and the second latitude may be latitude values indicating the latitude information, coordinate information for determining the latitude information, or a geographic information system (GIS) grid indicating the latitude information.

For example, the first latitude may be a latitude value A1, and the second latitude may be a latitude value B1. In this case, a latitude range of the geographic area determined by the terminal device is A1 to B1.

Optionally, the geographic area information may include longitude information. For example, the longitude information may be a first longitude and a second longitude. The first longitude and the second longitude are used by the terminal device to determine a range of a geographic area. For example, the first longitude and the second longitude indicate a left boundary and a right boundary of the geographic area. The first longitude and the second longitude may be longitude values indicating the longitude information, coordinate information for determining the longitude information, or a GIS grid indicating the latitude information.

For example, the first longitude may be a longitude value A2, and the second longitude may be a longitude value B2. In this case, a longitude range of the geographic area determined by the terminal device is A2 to B2.

Optionally, the geographic area information may include latitude information and longitude information. For example, the latitude information may be a first latitude and a second latitude, the longitude information may be a first longitude and a second longitude, and the first latitude, the second latitude, the first longitude, and the second longitude are used by the terminal device to determine a range of a geographic area.

For example, the first latitude may be a latitude value A1, the second latitude may be a latitude value B1, the first longitude may be a longitude value A2, and the second longitude may be a longitude value B2. In this case, the range of the geographic area determined by the terminal device is the latitude value A1 to the latitude value B1, and the longitude value A2 to the longitude value B2.

Optionally, the geographic area information may include a first longitude and a first distance, the first longitude and the first distance are used by the terminal device to determine a range of a geographic area, and the first distance may be a value for determining a second longitude. For example, the first longitude may be a longitude value A3, and the first distance is H1. In this case, a second longitude value is a longitude value distancing from the longitude value A3 for the first distance H1 eastward or westward.

Optionally, the geographic area information may include a first latitude and a second distance, the first latitude and the second distance are used by the terminal device to determine a range of a geographic area, and the second distance may be a value for determining a second latitude. For example, the first latitude may be a latitude value A4, and the second distance is H2. In this case, a second latitude value is a latitude value distancing from the latitude value A4 for the second distance H2 southward or northward.

Optionally, the geographic area information may include a third latitude, a third longitude, and a first radius. The third latitude, the third longitude, and the first radius are used by the terminal device to determine a range of a geographic area. The first radius a value that is centered around an intersection point of the third latitude and the third longitude.

For example, the third latitude and the third longitude may be represented by coordinates X (A5, B5) of a point, and a value of the first radius is R1. In this case, the geographic area indicated by the geographic area information is a circular area centered at the coordinates X with the radius R1.

The following describes the geographic area information with reference to a specific embodiment. Details are not described herein.

Optionally, the geographic area information includes at least one cell identifier indicating at least one cell.

When a geographic area includes one or more cell identifiers, to be specific, when the access control information is associated with the one or more cell identifiers, precise access control can be implemented on the terminal device in the cell.

S220. Send the first message to the terminal device.

A network device sends the first message to the terminal device, and the terminal device determines, based on the first message, whether the access request message can be sent to the network device. Sending of the access request message may also be referred to as an access attempt.

In this technical solution, the network device sends, to the terminal device, the access control information associated with the geographic area information, and the terminal device determines, based on the first message, whether the access request message can be sent to the network device. Using this solution can avoid frequent updating of the access control parameter due to location changes, and reduce power consumption of the network device.

Optionally, the foregoing method may further include the following steps.

S221. Send a second message to the terminal device.

The second message is for configuring the N pieces of access control information and the M pieces of geographic area information, the N pieces of access control information and the M pieces of geographic area information are carried in the second message, or the second message includes the N pieces of access control information and the M pieces of geographic area information.

Alternatively, the second message includes N access control information indexes and M geographic area information indexes, the N access control information indexes one-to-one correspond to the N pieces of access control information, and the M geographic area information indexes one-to-one correspond to the M pieces of geographic area information.

Alternatively, the second message is for configuring the N pieces of access control information and the M pieces of geographic area information, and the second message further includes N access control information indexes and M geographic area information indexes. The N access control information indexes one-to-one correspond to the N pieces of access control information, and the M geographic area information indexes one-to-one correspond to the M pieces of geographic area information.

Optionally, each piece of geographic area information may be associated with or correspond to one piece of access control information; or a plurality of pieces of geographic location information may be associated with or correspond to one piece of access control information.

In this technical solution, when a plurality of pieces of geographic area information correspond to one piece of access control information, the network device needs to send the access control information only once, and the terminal device may select the corresponding access control information based on the access control information index, to reduce a data amount in the second message and signaling consumption.

Optionally, corresponding to the foregoing Manner 1, the first message includes the N access control information indexes and the M geographic area information indexes. In this case, the second message may include the N pieces of access control information and the M pieces of geographic area information.

Optionally, corresponding to the foregoing Manner 2, the first message includes the N pieces of access control information and the M geographic area information indexes. In this case, the second message may include the N access control information indexes and the M pieces of geographic area information.

Optionally, corresponding to the foregoing Manner 3, the first message includes the N access control information indexes and the M pieces of geographic area information. In this case, the first message may include the N pieces of access control information and the M geographic area information indexes.

Optionally, the second message is for configuring the N pieces of access control information, or the N pieces of access control information are carried in the second message. The method may further include: sending a message for configuring the M pieces of geographic area information to the terminal device. The message for configuring the N pieces of access control information and the message for configuring the M pieces of geographic area information are separately sent, and a sequence of sending thereof is not limited.

Optionally, the first message is for configuring the N pieces of access control information, and the second message is for configuring the M pieces of geographic area information; or the first message is for configuring the M pieces of geographic area information, and the second message is for configuring the N pieces of access control information. This is not limited. For example, the first message includes the N pieces of access control information and the correspondence between the N pieces of access control information and the M pieces of geographic area information, and the second message includes the M pieces of geographic area information. Alternatively, the first message includes the N pieces of access control information, and the second message includes the M pieces of geographic area information and the correspondence between the M pieces of geographic area information and the N pieces of access control information. Alternatively, the first message includes the N pieces of access control information, and the second message includes the M pieces of geographic area information. The network device further sends indication information to the terminal device, where the indication information indicates the correspondence between the N pieces of access control information and the M pieces of geographic area information.

S230. The terminal device receives the first message, where the first message indicates the correspondence between the N pieces of access control information and the M pieces of geographic area information, the access control information is used by the terminal device to determine whether the access request message can be sent, and N and M are positive integers.

Optionally, the first message includes the configuration information of the N pieces of access control information and the configuration information of the M pieces of geographic area information; or the first message includes the N access control information indexes and the M geographic area information indexes. The N access control information indexes one-to-one correspond to the N pieces of access control information, and the M geographic area information indexes one-to-one correspond to the M pieces of geographic area information.

Based on the foregoing technical solution, when a plurality of pieces of geographic area information correspond to one piece of access control information, the network device needs to send, to the terminal device only once, the access control information and an index corresponding to the access control information, and the terminal device may select the corresponding access control information based on the index. This technical solution can reduce a data amount in the first message, reduce signaling consumption, and reduce power consumption of the network device and the terminal device.

S240. The terminal device determines, based on a current geographic location and the first message, whether a first access request message can be sent.

The current geographic location may be understood as a geographic location at which the terminal device is currently located.

Optionally, before the terminal device receives the first message, the method may further include step S241: The terminal device receives the second message.

The second message is for configuring the N pieces of access control information and the M pieces of geographic area information. In other words, the N pieces of access control information and the M pieces of geographic area information are carried in the second message.

Alternatively, the second message includes the N access control information indexes and the M geographic area information indexes, the N access control information indexes one-to-one correspond to the N pieces of access control information, and the M geographic area information indexes one-to-one correspond to the M pieces of geographic area information.

Alternatively, the second message is for configuring the N pieces of access control information and the M pieces of geographic area information, and the second message further includes the N access control information indexes and the M geographic area information indexes. The N access control information indexes one-to-one correspond to the N pieces of access control information, and the M geographic area information indexes one-to-one correspond to the M pieces of geographic area information.

Optionally, the method further includes step S242: The terminal device determines, based on the current geographic location, whether target geographic area information exists in the M pieces of geographic area information.

The current geographic location indicates the geographic location at which the terminal device is currently located, and the target geographic area information indicates a geographic area that includes the current geographic location of the terminal device. The target geographic area information may be one piece of the M pieces of geographic area information.

Optionally, the terminal device determines, based on the target geographic area information and the first message, target access control information corresponding to the target geographic area information, and determines, based on the target access control information, whether the first access request message can be sent.

The target access control information is access control information corresponding to the geographic area that includes the current geographic location of the terminal device. The target access control information is used by the terminal device to determine whether the first access request message (namely, an access attempt) can be sent.

For example, the terminal device may determine, based on the geographic location at which the terminal device is currently located, the target geographic area information that includes the current geographic location, to determine the target access control information corresponding to the target geographic area information. The terminal device determines, based on the target access control information, whether the terminal device can or cannot send the access request message to the network device.

Optionally, if a geographic area indicated by the M pieces of geographic area information does not include the current geographic location of the terminal device, it is determined that the access request message can be sent.

If the geographic location at which the terminal device is located is not included in the geographic area indicated by the M pieces of geographic area information, the terminal device determines that the terminal device can send the access request message to the network device.

Optionally, if the geographic area indicated by the M pieces of geographic area information does not include the current geographic location of the terminal device, it is determined that the access request message cannot be sent.

If the geographic location at which the terminal device is located is not included in the geographic area indicated by the M pieces of geographic area information, the terminal device determines that the terminal device cannot send the access request message to the network device.

Optionally, the geographic area information may include a first latitude and a second latitude; a first longitude and a second longitude; a first latitude, a second latitude, a first longitude, and a second longitude; a first longitude and a first distance; or a first latitude and a second distance. Alternatively, the geographic area information includes a third latitude value, a third longitude value, and a first radius, where the first radius is centered around an intersection point of the third latitude value and the third longitude value.

It should be understood that for specific meanings of the first latitude, the second latitude, the first longitude, the second longitude, the first distance, the second distance, the third longitude, the third latitude, and the first radius, refer to related descriptions in step S210. Details are not described again.

Optionally, the geographic area information indicates at least one cell.

Based on the foregoing technical solution, the network device sends, to the terminal device, the access control information associated with the geographic area information. The terminal device selects the corresponding access control information based on the geographic location at which the terminal device is located, and determines, based on the selected access control information, whether the access attempt can be made. Using this technical solution avoids frequent updating of the access control parameter due to location changes of the network device, and reduces power consumption of the network device and the terminal device.

Figure 3A:
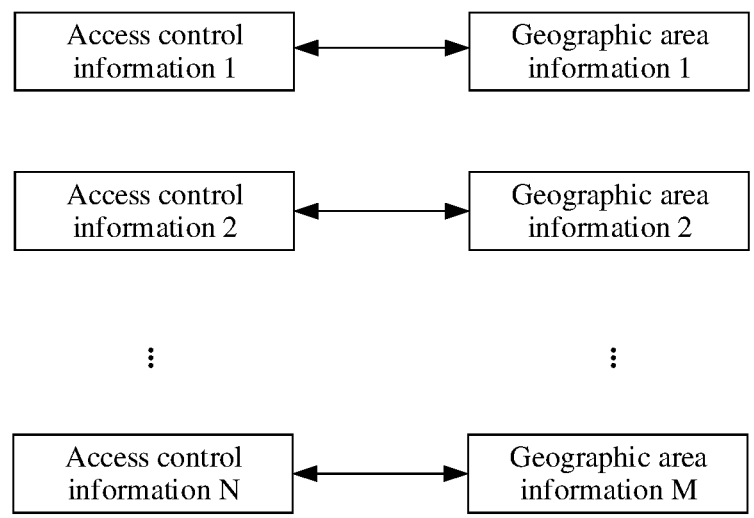
FIG. 3(a) to FIG. 3(d) are schematic diagrams of correspondences between access control information and geographic area information according to an embodiment of this application.

FIG. 3(a) to FIG. 3(d) are schematic diagrams of correspondences between access control information and geographic area information according to an embodiment of this application. As shown in FIG. 3(a), N pieces of access control information may form a list of access control information, and M pieces of geographic area information may form a list of geographic area information. The access control information one-to-one corresponds to the geographic area information. In this case, N is equal to M and is a positive integer.

It should be understood that the manner in which the pieces of access control information one-to-one correspond to the pieces of geographic area information shown in FIG. 3(a) is merely an example, and should not constitute any limitation on this application. For example, access control information 1 may alternatively correspond to geographic area information 2 or geographic area information N. This is not specifically limited in this embodiment of this application.

Figure 3B:
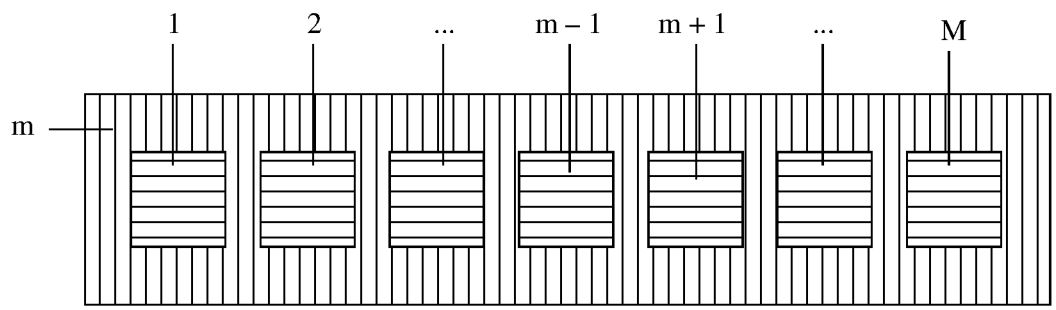

It should be noted that, if geographic area information m (m is a positive integer less than or equal to M) does not indicate a specific geographic area, or the geographic area information m is an empty set, the geographic area information m may indicate a geographic area other than a geographic area indicated by geographic area information 1, geographic area information 2, . . . , geographic area information m−1, geographic area information m+1, . . . , and geographic area information M. As shown in FIG. 3(b), the M pieces of geographic area information indicate horizontal shadow areas and vertical shadow areas in the figure. The geographic area information m indicates the geographic area other than the geographic area indicated by the geographic area information 1, the geographic area information 2, . . . , the geographic area information m−1, the geographic area information m+1, . . . , and the geographic area information M.

Alternatively, if access control information n (n is a positive integer less than or equal to N) corresponding to the geographic area information m is an empty set, the access control information n indicates that a terminal device in the geographic area indicated by the geographic area information m can send an access request message or is prohibited from sending the access request message.

For example, the access control information n may indicate an access factor X, where a value of X ranges from 0 to 1. When determining whether the access request message can be sent to a network device, the UE generates a random number Y. If Y is greater than X, the UE determines that the access request message can be sent to the network device. If Y is less than or equal to X, the terminal device determines that the access request message cannot be sent to the network device.

Alternatively, if the access control information n corresponding to the geographic area information m is specific access control information, the specific access control information indicates that the terminal device in the geographic area indicated by the geographic area information m can send the access request message or is prohibited from sending the access request message.

Figure 3C:
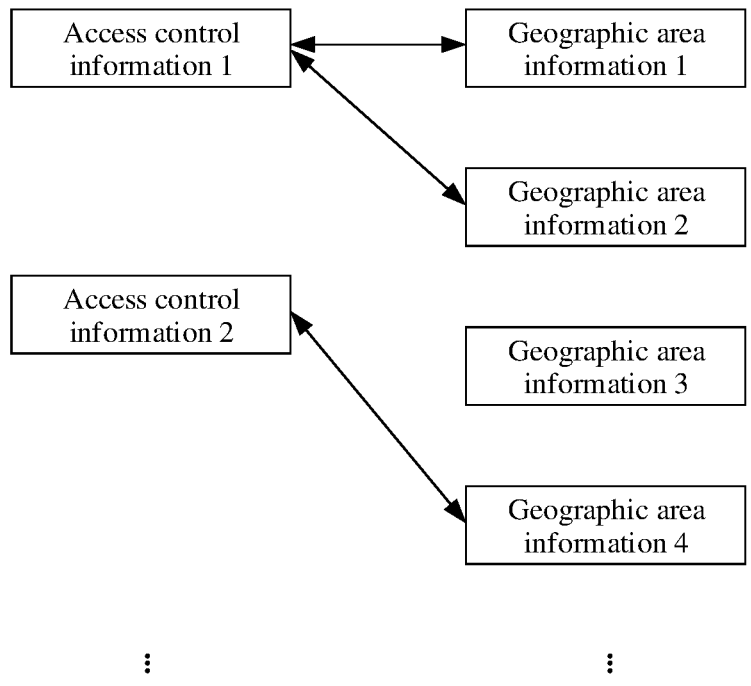

Alternatively, if the geographic area information m is not configured to be corresponding to any access control information, the terminal device in the geographic area indicated by the geographic area information m determines that the terminal device can send the access request message or is prohibited from sending the access request message. As shown in FIG. 3(c), if geographic area information 3 is not configured to be corresponding to any access control information, a terminal device in the geographic area information 3 determines that the terminal device in the geographic area information 3 can send the access request message to the network device, or the terminal device in the geographic area information 3 determines that the terminal device in the geographic area information 3 is prohibited from sending the access request message to the network device.

Figure 3D:
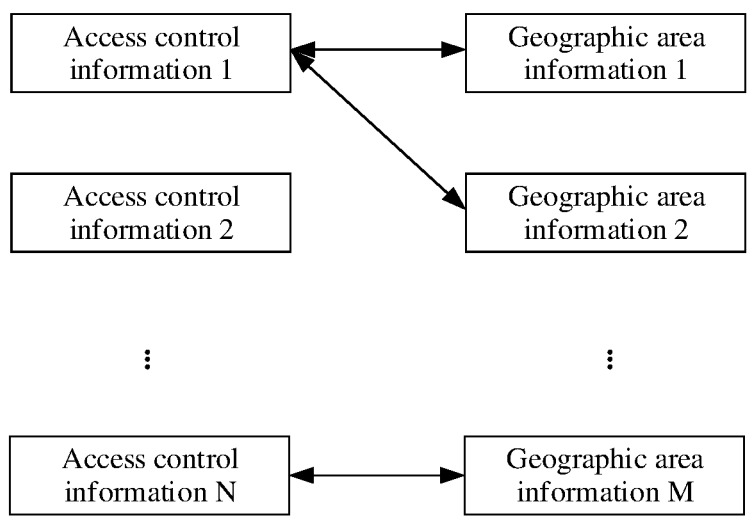

As shown in FIG. 3(d), the N pieces of access control information may form a list of access control information, and the M pieces of geographic area information may form a list of geographic area information. Geographic area information 1 and geographic area information 2 correspond to access control information 1. In this case, N and M are positive integers.

It should be understood that FIG. 3(d) shows an example in which a plurality of pieces of geographic area information correspond to one piece of access control information, that is, two pieces of geographic area information correspond to one piece of access control information. However, this should not constitute any limitation on this application. For example, in this embodiment of this application, three or more pieces of geographic area information may correspond to one piece of access control information. This is not specifically limited in this embodiment of this application.

Figure 4:
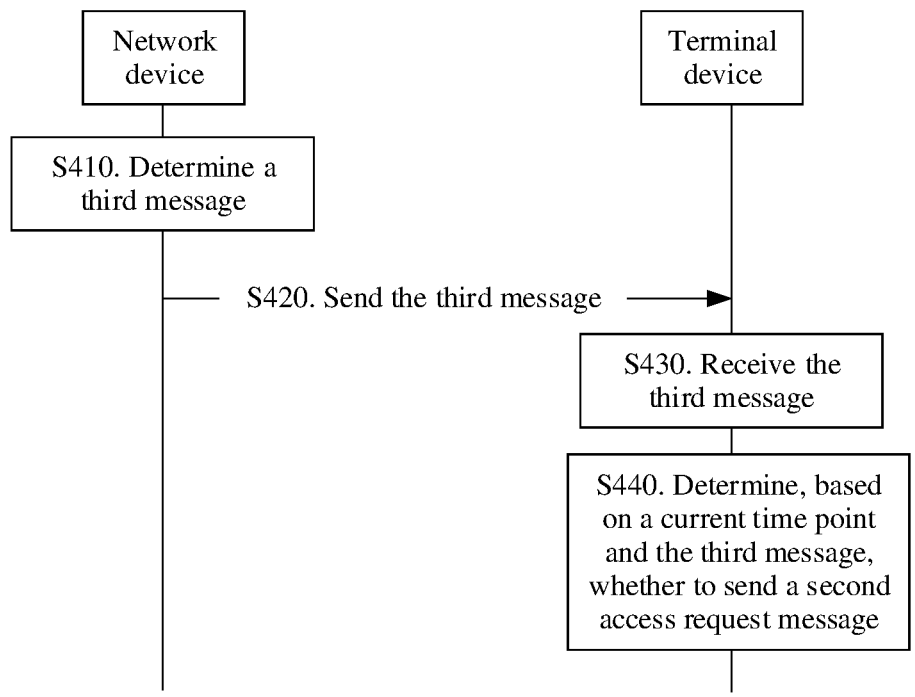
FIG. 4 is another schematic flowchart of a communication method according to an embodiment of this application.

FIG. 4 is another schematic interaction diagram of a communication method according to an embodiment of this application. As shown in FIG. 4, the method may include step S410 to step S440.

S410. Determine a third message, where the third message indicates a correspondence between N pieces of access control information and M pieces of time information. The access control information is used by a terminal device to determine whether an access request message can be sent. N and M are positive integers.

The access control information is used by the terminal device to determine whether the access request message can be sent. The time information may also be understood as time period information, and indicates one or more time points (moments) or one or more time periods.

The correspondence may be that one piece of time information is associated with or corresponds to one piece of access control information; or a plurality of pieces of time information are associated with or correspond to one piece of access control information.

Optionally, the third message includes configuration information of the N pieces of access control information and configuration information of the M pieces of time information; or the configuration information of the N pieces of access control information and the configuration information of the M pieces of time information are carried in the third message.

The configuration information of the N pieces of access control information is for configuring the N pieces of access control information, and the configuration information of the M pieces of time information is for configuring the M pieces of time information.

For example, the configuration information may be for configuring the N pieces of access control information and the M pieces of time information, and the correspondence between the N pieces of access control information and the M pieces of time information.

Content specifically included in the third message may be implemented in the following manners.

Manner 1: Optionally, the third message includes N access control information indexes and M geographic area information indexes, where the N access control information indexes one-to-one correspond to the N pieces of access control information, and the M time information indexes one-to-one correspond to the M pieces of time information.

The access control information index one-to-one corresponds to the time information index, or a plurality of time information indexes correspond to one access control information index.

Manner 2: Optionally, the third message includes the N pieces of access control information and M time information indexes, and the M time information indexes one-to-one correspond to the M pieces of time information.

The access control information one-to-one corresponds to the time information indexes, or a plurality of time information indexes correspond to one piece of access control information.

Manner 3: The third message includes N access control information indexes and the M pieces of time information, and the N access control information indexes one-to-one correspond to the N pieces of access control information.

The access control information index one-to-one corresponds to the time information, or a plurality of pieces of time information correspond to one access control information index.

Optionally, the time information may include a time range; or the time information may include a moment and duration. The following describes the time information with reference to a specific embodiment. Details are not described herein again.

S420. Send the third message to the terminal device.

A network device sends the third message to the terminal device, and the terminal device may determine, based on current time information and the third message, whether to send the access request message to the network device.

Optionally, before sending the third message to the terminal device, the method may further include: sending a fourth message to the terminal device.

The fourth message is for configuring the N pieces of access control information and the M pieces of time information, and/or the fourth message includes N access control information indexes and M time information indexes. The N access control information indexes one-to-one correspond to the N pieces of access control information, and the M time information indexes one-to-one correspond to the M pieces of time information.

Optionally, corresponding to the foregoing Manner 1, the third message includes the N access control information indexes and the M time information indexes. In this case, the fourth message may include the N pieces of access control information and the M pieces of time information.

Optionally, corresponding to the foregoing Manner 2, the third message includes the N pieces of access control information and the M time information indexes. In this case, the fourth message may include the N access control information indexes and the M pieces of time information.

Optionally, corresponding to the foregoing Manner 3, the third message includes the N access control information indexes and the M pieces of time information. In this case, the fourth message may include the N pieces of access control information and the M time information indexes.

Optionally, the fourth message is for configuring the N pieces of access control information, or the N pieces of access control information are carried in the fourth message. The method may further include: sending a message for configuring the M pieces of time information to the terminal device. The message for configuring the N pieces of access control information and the message for configuring the M pieces of time information are separately sent, and a sequence is not limited.

Optionally, the third message is for configuring the N pieces of access control information, and the fourth message is for configuring the M pieces of time information, or the third message is for configuring the M pieces of time information, and the fourth message is for configuring the N pieces of access control information. This is not limited. For example, the third message includes the N pieces of access control information and the correspondence between the N pieces of access control information and the M pieces of time information, and the fourth message includes the M pieces of time information. Alternatively, the third message includes the N pieces of access control information, and the fourth message includes the M pieces of time information and the correspondence between the M pieces of time information and the N pieces of access control information. Alternatively, the third message includes the N pieces of access control information, and the fourth message includes the M pieces of geographic area information. The network device further sends indication information to the terminal device, where the indication information indicates the correspondence between the N pieces of access control information and the M pieces of time information.

Optionally, the method may further include: sending reference information to the terminal device, where the reference information is for determining the current time information; or sending first time information to the terminal device, where the first time information indicates the current time information.

In a possible implementation, the reference information may indicate a geographic location of a reference point and a running speed of the network device. A time point of the reference point may be T=0. The terminal device may determine a time point of the terminal device relative to the reference point based on a geographic location of the terminal device, the geographic location of the reference point, and the running speed of the network device, so as to determine the current time information.

In another possible implementation, the network device may further send a first time information to the terminal device, where the first time information may indicate effective duration of the access control information, and the terminal device determines the current time information based on the first time information.

For example, the network device sends the first time information to the terminal device, where the first time information indicates that effective duration of access control information A is 2 o'clock to 3 o'clock, and duration indicated by the current time information is 2 o'clock to 3 o'clock. When a current time point of the terminal device falls within 2 o'clock to 3 o'clock, the terminal device selects the access control information A as target access control information, and determines, based on the target access control information, whether the access request message can be sent to the network device. When the current time point of the terminal device does not fall within the interval of 2 o'clock to 3 o'clock, for example, the current time point of the terminal device is 1 o'clock, it is determined that the duration indicated by the time information does not include the current time point of the terminal device, and the terminal device determines that the terminal device can send or is prohibited from sending the access request message to the network device.

S430. The terminal device receives the third message, where the third message indicates the correspondence between the N pieces of access control information and the M pieces of time information, the access control information is used by the terminal device to determine whether to send the access request message, and N and M are positive integers.

Optionally, the third message includes the configuration information of the N pieces of access control information and the configuration information of the M pieces of time information; or the third message includes the N access control information indexes and the M time information indexes. The N access control information indexes one-to-one correspond to the N pieces of access control information, and the M time information indexes one-to-one correspond to the M pieces of time information.

Optionally, before the terminal device receives the third message, the method may further include the following steps.

S431. Receive the fourth message, where the fourth message is for configuring the N pieces of access control information and the M pieces of geographic area information, and/or the fourth message includes the N access control information indexes and the M time information indexes. The N access control information indexes one-to-one correspond to the N pieces of access control information, and the M time information indexes one-to-one correspond to the M pieces of time information.

S432. Determine, based on the current time point, whether the current time information exists in the M pieces of time information.

The current time point indicates a current time point of the terminal device, or a relative reference time point of the current time point of the terminal device relative to a reference point. This is not limited. The current time information may also be referred to as target time information, and indicates time information that includes the current time point of the terminal device.

S440. The terminal device determines, based on the current time point and the third message, whether to send a second access request message.

The terminal device may determine, based on the current time point and the received third message, whether to send the second access request message to the network device.

It should be understood that the second access request message and the first access request message in the embodiment in FIG. 2 may be a same message.

Optionally, the terminal device determines, based on the current time information and the third message, the target access control information corresponding to the current time information, and determines, based on the target access control information, whether the second access request message can be sent.

For example, duration indicated by the M pieces of time information includes the current time point of the terminal device, that is, the current time information exists. The terminal device may perform the following operations based on the current time information: selecting, from the third message, target access control information corresponding to the current time information or selecting corresponding target access control information based on a target access control information index, and determining, based on the target access control information, whether the second access request message can be sent.

Optionally, if the duration indicated by the M pieces of time information does not include the time point of the terminal device, the terminal device determines that the second access request message may be sent.

For example, if the duration indicated by the M pieces of time information does not include the current time point of the terminal device, that is, the M pieces of time information do not include the current time information, the target access control information does not exist either, and the terminal device determines that the second access request message can be sent to the network device. Alternatively, the terminal device determines that the second access request message cannot be sent to the network device.

Optionally, the time information includes at least one moment, and the at least one moment indicates at least one time period; or the time information includes a first moment and first duration.

Optionally, the method may further include the following step.

S450. The terminal device receives reference information, where the reference information is for determining the current time information; or the terminal device receives first time information, where the first time information indicates the current time information.

In the foregoing technical solution, the network device sends, to the terminal device, access control information associated with time information. The terminal device selects corresponding target access control information based on time information of the terminal device, and determines, based on the selected target access control information, whether to send an access request to the network device. Using this solution can avoid frequent updating of the access control information due to location changes of the network device, and reduce power consumption of the network device and the terminal device.

Figure 5A:
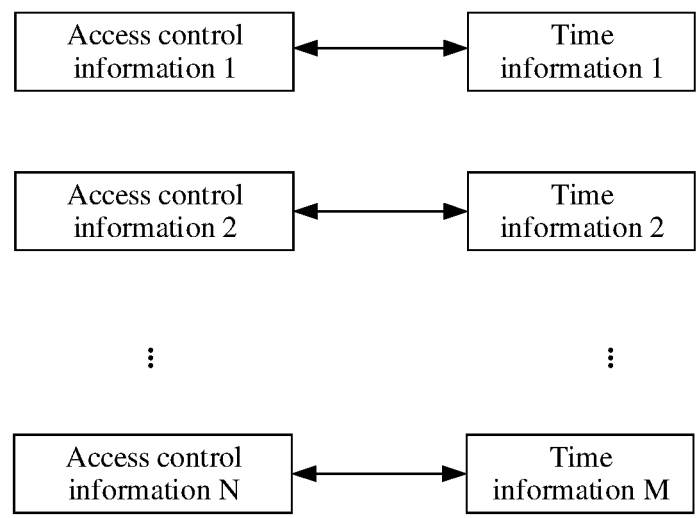
FIG. 5(a) to FIG. 5(d) are schematic diagrams of correspondences between access control information and time information according to an embodiment of this application.
Figure 5B:
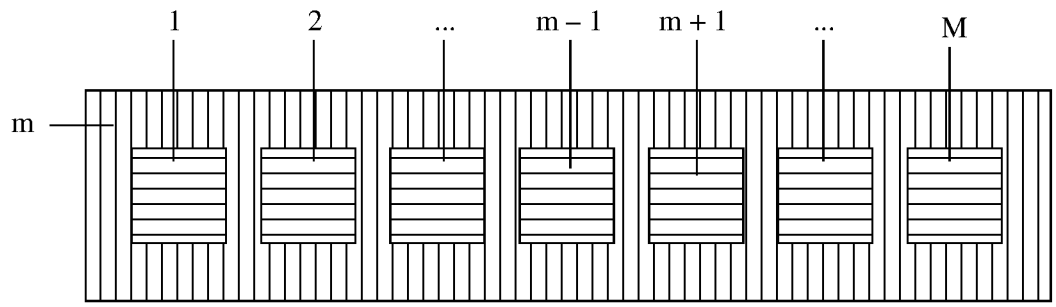
Figure 5C:
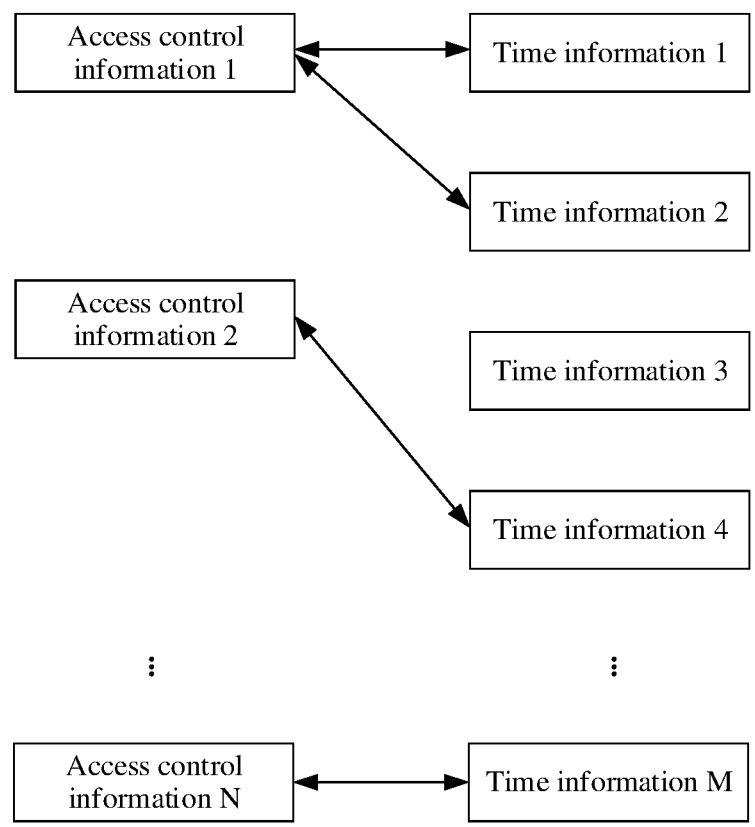

FIG. 5(a) to FIG. 5(d) are schematic diagrams of correspondences between access control information and time information according to an embodiment of this application. As shown in FIG. 5(a), N pieces of access control information may form a list of access control information, and M pieces of time information may form a list of time information. The access control information one-to-one corresponds to the time information. In this case, N is equal to M and is a positive integer.

It should be understood that the manner in which the pieces of access control information one-to-one correspond to the pieces of time information shown in FIG. 5(a) is merely an example, and should not constitute any limitation on this application. For example, access control information 1 may alternatively correspond to time information 2 or time information N. This is not specifically limited in this embodiment of this application.

It should be noted that, if time information m (m is a positive integer less than or equal to M) does not indicate a specific time point, or the time information m is an empty set, the time information m may indicate a time point other than duration indicated by time information 1, time information 2, . . . , time information m−1, time information m+1, . . . , and time information M. As shown in FIG. 3(b), the M pieces of time information indicate a time point of a terminal device in shadow areas of horizontal lines and a time point of a terminal device in shadow areas of vertical lines in the figure, the time information m indicates the time point other than the duration indicated by the time information 1, the time information 2, . . . , the time information m−1, the time information m+1, . . . , and the time information M.

Alternatively, if access control information n (n is a positive integer less than or equal to N) corresponding to the time information m is an empty set, the access control information n indicates that the terminal device in the duration indicated by the time information m can send an access request message or is prohibited from sending the access request message.

It should be understood that, for a manner in which the terminal device determines whether the access request message can be sent to the network device in this embodiment of this application, refer to the descriptions in FIG. 3(a) to FIG. 3(d). For brevity, details are not described again.

Alternatively, if the access control information n corresponding to the time information m is specific access control information, and the specific access control information indicates that the terminal device in the duration indicated by the time information m can send the access request message or is prohibited from sending the access request message.

Alternatively, if the time information m is not configured to be corresponding to any access control information, the terminal device in the duration indicated by the time information m determines that the terminal device can send the access request message or is prohibited from sending the access request message. As shown in FIG. 3(c), if time information 3 is not configured to be corresponding to any access control information, a terminal device in duration indicated by the time information 3 determines that the terminal device can send an access request message to the network device, or the terminal device indicated by the time information 3 determines that the terminal device is prohibited from sending the access request message to the network device.

Figure 5D:
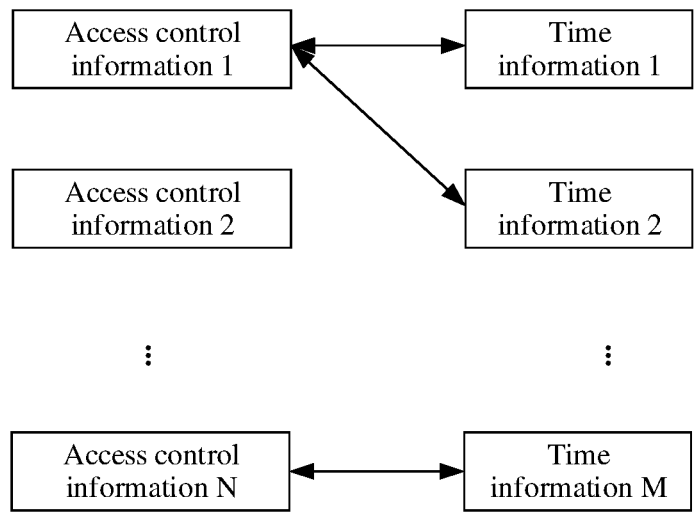

As shown in FIG. 5(d), the N pieces of access control information may form a list of access control information, and M pieces of geographic area information may form a list of geographic area information. Time information 1 and time information 2 correspond to access control information 1. In this case, N and M are positive integers.

It should be understood that FIG. 5(d) shows an example in which a plurality of pieces of time information correspond to one piece of access control information, that is, two pieces of time information correspond to one piece of access control information. However, this should not constitute any limitation on this application. For example, in this embodiment of this application, three or more pieces of time information may correspond to one piece of access control information. This is not specifically limited in this embodiment of this application.

Figure 6:
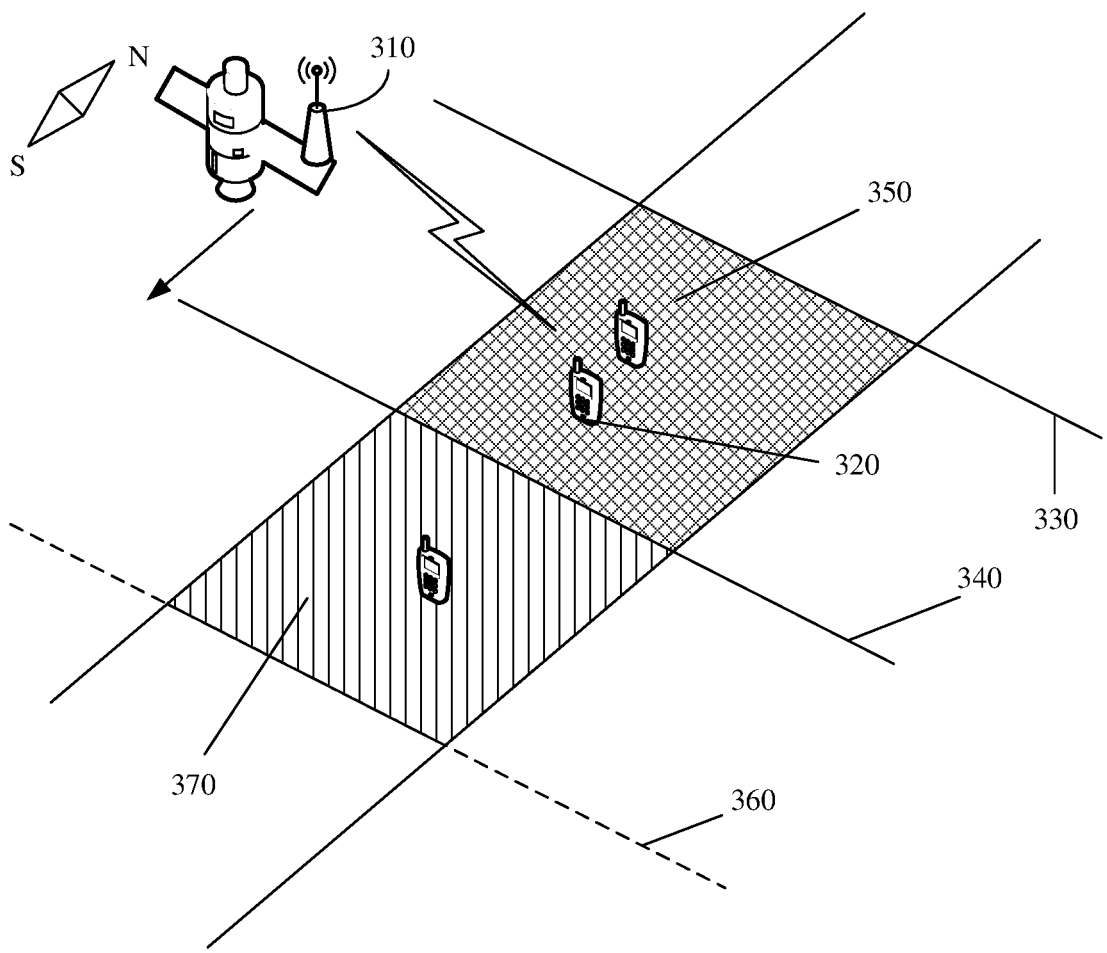
FIG. 6 is a schematic diagram of determining geographic area information according to an embodiment of this application.

FIG. 6 is a schematic diagram of determining geographic area information according to an embodiment of this application. As shown in FIG. 6, geographic area information in this embodiment of this application may include a first latitude value 330 and a second latitude value 340. A terminal device may determine a geographic area 350 based on signal coverage of a network device, the first latitude value 330, and the second latitude value 340.

The terminal device 320 may determine target geographic area information based on a geographic location at which the terminal device 320 is located and M pieces of geographic area information. The target geographic area information indicates the geographic area 350. The terminal device 320 determines, from N pieces of access control information, based on the target geographic area information, target access control information corresponding to the target geographic area information. If the current geographic location of the terminal device 320 is included in the geographic area 350, the terminal device 320 selects first access control information (namely, the target access control information) corresponding to the target geographic area information indicating the geographic area 350, and determines, based on the first access control information, whether an access request message can be sent to a network device 310. When determining, based on the first access control information, that sending of the access request message to the network device 310 is allowed, the terminal device 320 can send the access request message to the network device 310. When determining, based on the first access control information, that sending of the access request message to the network device 310 is not allowed, the terminal device 320 is prohibited from sending the access request message. If the geographic location of the terminal device 320 is not included in a geographic area indicated by any piece of geographic area information, the terminal device 320 determines that the terminal device 320 can send the access request message to the network device 310, or the terminal device 320 determines that the terminal device 320 is prohibited from sending the access request message to the terminal device 320.

Optionally, as shown in FIG. 6, the geographic area information may further include a third latitude value 360. The terminal device may determine a geographic area 370 based on the signal coverage of the network device, the second latitude value 340, and the third latitude value 360. The geographic area 370 may be associated with second access control information. In this case, the terminal device 320 in the geographic area 350 may select the first access control information as the target access control information, and a terminal device 321 in the geographic area 370 may select the second access control information as the target access control information, and determine, based on the target access control information, whether an access request message can be sent to the network device 310.

It should be understood that, for a manner in which the terminal device determines whether the access request message can be sent to the network device in this embodiment of this application, refer to the descriptions in FIG. 3(a) to FIG. 3(d). For brevity, details are not described again.

Optionally, the geographic area 370 may alternatively be associated with the first access control information. In this case, both the terminal device in the geographic area 350 and the terminal device in the geographic area 370 may determine, based on the first access control information, whether the access request message can be sent to the network device 310.

Optionally, if the geographic location of the terminal device 320 is neither included in the geographic area 350 nor included in the geographic area 370, the terminal device 320 determines that there is no corresponding access control information. The terminal device 320 determines that the terminal device 320 can send the access request message to the network device 310, or the terminal device 320 determines that the terminal device 320 is prohibited from sending the access request message to the network device 310.

In a possible implementation, the terminal device 320 in the geographic area 350 may determine, based on the first access control information, whether the access request message can be sent to the network device 310. The second access control information corresponding to the geographic area 370 is specific access control information, and the specific access control information indicates that the terminal device 321 in the geographic area 370 is prohibited from sending the access request message to the network device 310.

Figure 7:
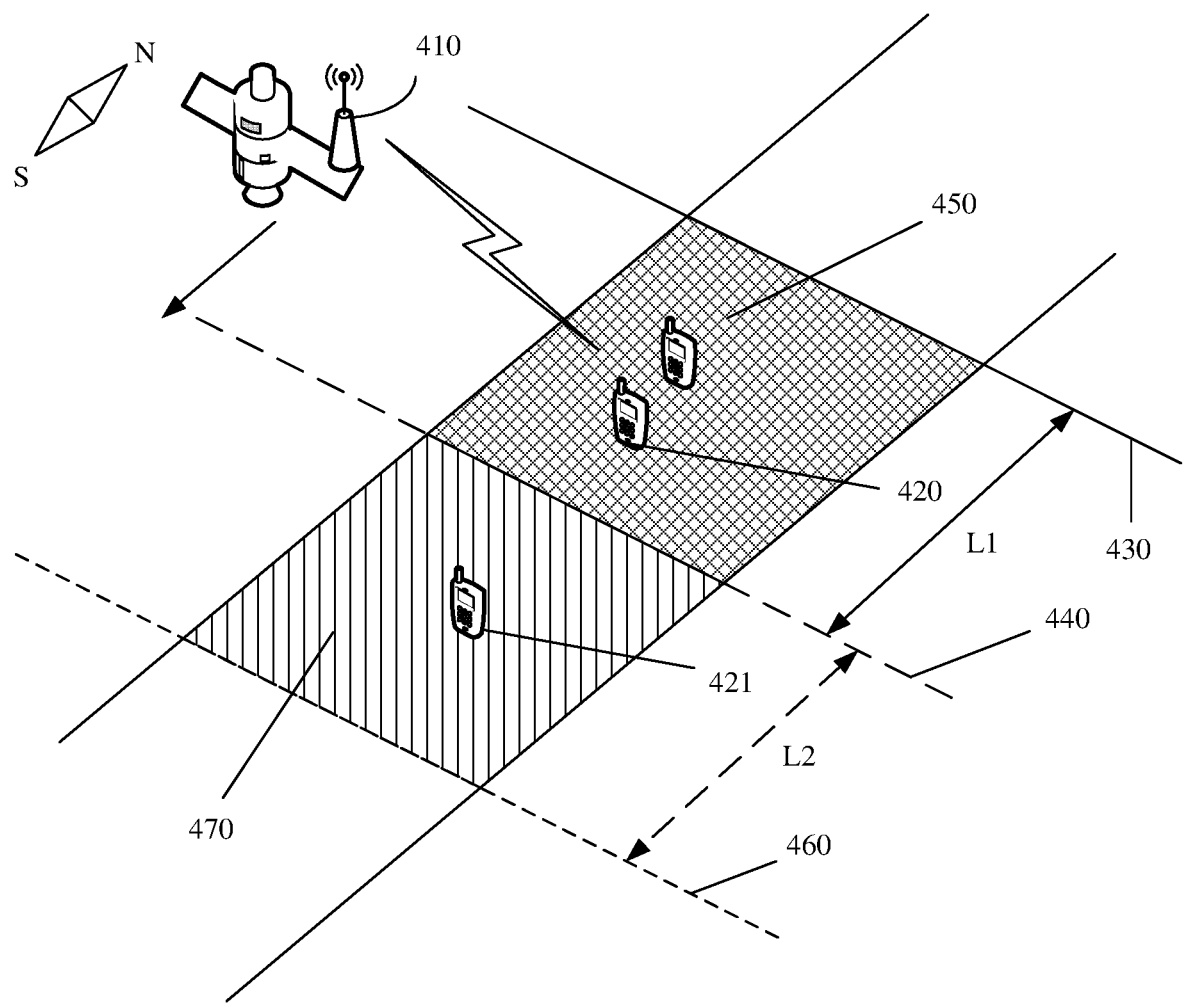
FIG. 7 is another schematic diagram of determining geographic area information according to an embodiment of this application.

FIG. 7 is another schematic diagram of determining geographic area information according to an embodiment of this application. As shown in FIG. 7, geographic area information in this embodiment of this application may include a first latitude value 430 and a first distance L1. A terminal device may determine a geographic area 450 based on signal coverage of a network device, the first latitude value 430, and the first distance L1.

The terminal device 420 may determine target geographic area information based on a geographic location at which the terminal device 420 is located and M pieces of geographic area information, to determine, from N pieces of access control information, target access control information corresponding to the target geographic area information. The target geographic area information indicates the geographic area 450. If the geographic location of the terminal device 420 is included in the geographic area 450, the terminal device 420 selects, as the target access control information, first access control information corresponding to the target geographic area information indicating the geographic area 450, and determines, based on the first access control information, whether an access request message can be sent. If the geographic location of the terminal device 420 is not included in the geographic area 450, the terminal device 420 determines that the terminal device 420 can send the access request message to the network device 410, or the terminal device 420 determines that the terminal device 420 is prohibited from sending the access request message to the network device 410.

Optionally, as shown in FIG. 7, the geographic area information may further include a second latitude value 440 and a second distance L2. The terminal device may determine a geographic area 470 based on the signal coverage of the network device, the second latitude value 440, and the second distance L2. The geographic area 470 may be associated with second access control information. In this case, the terminal device 420 in the geographic area 450 may select the first access control information as the target access control information, and a terminal device 421 in the geographic area 470 may select the second access control information as the target access control information, and determine, based on the target access control information, whether the access request message can be sent to the network device 410.

Optionally, the geographic area 470 may alternatively be associated with the first access control information. In this case, both the terminal device 420 in the geographic area 450 and the terminal device 421 in the geographic area 470 may determine, based on the first access control information, whether the access request message can be sent to the network device 410.

Optionally, if the geographic location of the terminal device 420 is neither included in the geographic area 450 nor included in the geographic area 470, the terminal device 420 determines that there is no access control information corresponding to the geographic area. The terminal device 420 determines that the terminal device 420 can send the access request message to the network device 410, or the terminal device 420 may prohibit sending the access request message to the network device 410.

In a possible implementation, the terminal device 420 in the geographic area 450 may determine, based on the first access control information, whether to send the access request message to the network device 410. The second access control information corresponding to the geographic area 470 is specific access control information, and the specific access control information indicates that the terminal device 421 in the geographic area 470 is prohibited from sending the access request message to the network device 410.

Figure 8:
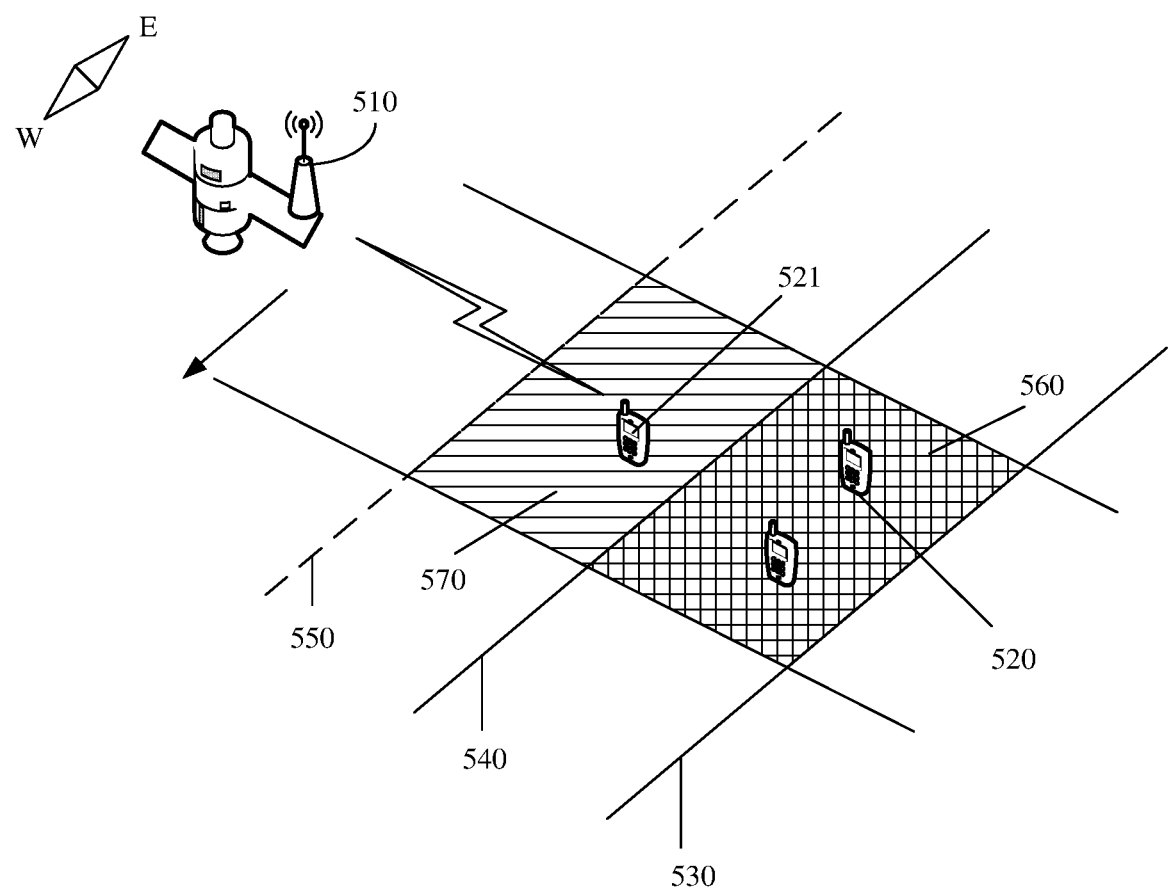
FIG. 8 is a schematic diagram of determining geographic area information according to an embodiment of this application.

FIG. 8 is a schematic diagram of determining geographic area information according to an embodiment of this application. As shown in FIG. 8, geographic area information in this embodiment of this application may include a first longitude value 530 and a second longitude value 540. A terminal device may determine a geographic area 560 based on signal coverage of a network device 510, the first longitude value 530, and the second longitude value 540.

The terminal device 520 may determine target geographic area information based on a geographic location at which the terminal device 520 is located and M pieces of geographic area information, where the target geographic area information indicates a geographic area 560. The terminal device 520 determines, from N pieces of access control information, based on the target geographic area information, target access control information corresponding to the target geographic area information. If the current geographic location of the terminal device 520 is included in the geographic area 560, the terminal device 520 selects first access control information (namely, the target access control information) corresponding to the target geographic area information indicating the geographic area 560, and determines, based on the first access control information, whether an access request message can be sent to the network device 510. If the geographic location of the terminal device 520 is not included in a geographic area indicated by any piece of geographic area information, the terminal device 520 determines that the terminal device 520 can send the access request message to the network device 510, or the terminal device 520 determines that the terminal device 520 is prohibited from sending the access request message to the network device 510.

Optionally, as shown in FIG. 8, the geographic area information may further include a third longitude value 550. The terminal device may determine a geographic area 570 based on the signal coverage of the network device, the second longitude value 540, and the third longitude value 550. The geographic area 570 may be associated with second access control information. In this case, the terminal device 520 in the geographic area 560 may select the first access control information as the target access control information, and a terminal device 521 in the geographic area 570 may select the second access control information as the target access control information, and determine, based on the target access control information, whether the access request message can be sent to the network device 510.

Optionally, the geographic area 570 may alternatively be associated with the first access control information. In this case, both the terminal device 520 in the geographic area 560 and the terminal device 521 in the geographic area 570 may determine, based on the first access control information, whether the access request message can be sent to the network device 510.

Optionally, if the geographic location of the terminal device 520 is neither included in the geographic area 560 nor included in the geographic area 570, the terminal device 520 determines that there is no access control information corresponding to the geographic area. The terminal device 520 determines that the terminal device 520 can send the access request message to the network device 510, or the terminal device 520 determines that the terminal device 520 is prohibited from sending the access request message to the network device 510.

In a possible implementation, the terminal device 520 in the geographic area 560 may determine, based on the first access control information, whether the access request message can be sent to the network device 510. The second access control information corresponding to the geographic area 570 is specific access control information, and the specific access control information indicates that the terminal device 521 in the geographic area 570 is prohibited from sending the access request message to the network device 510.

Figure 9:
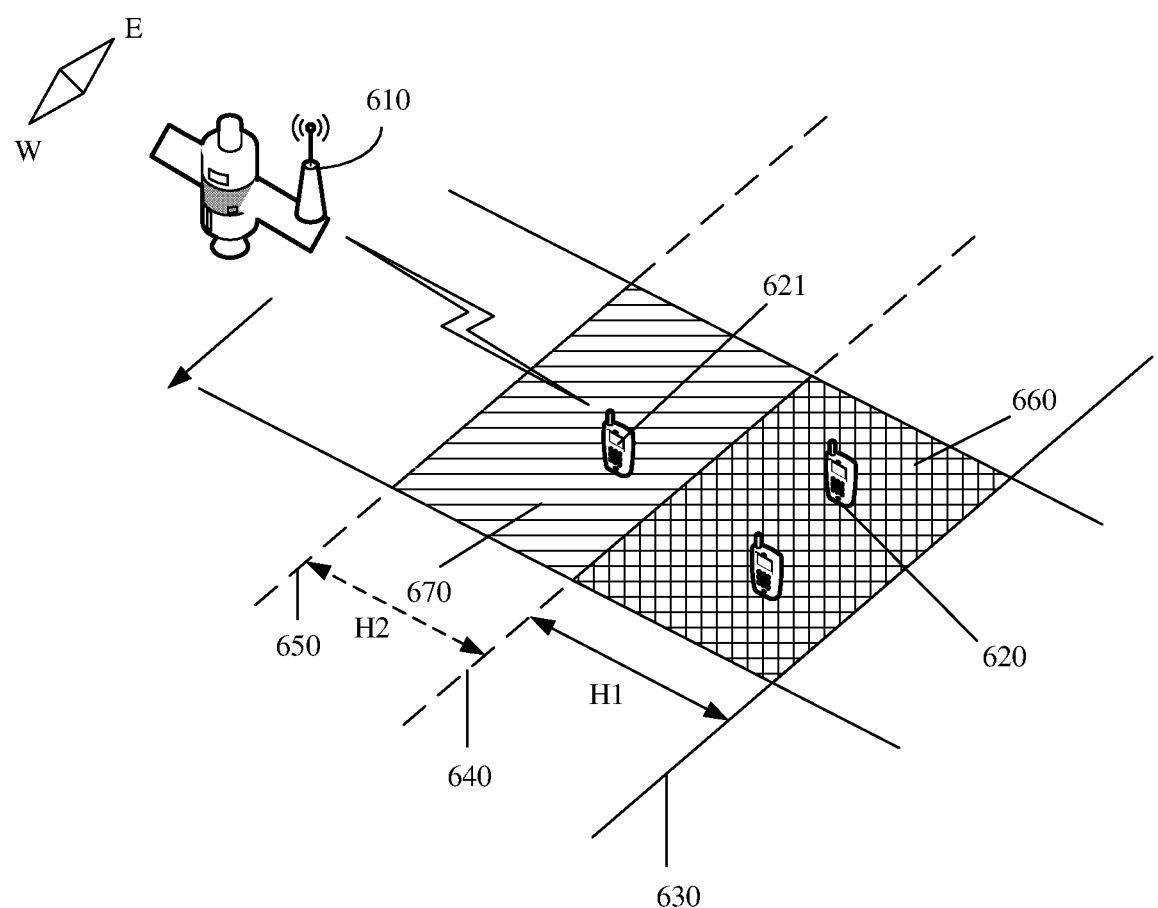
FIG. 9 is another schematic diagram of determining geographic area information according to an embodiment of this application.

FIG. 9 is another schematic diagram of determining geographic area information according to an embodiment of this application. As shown in FIG. 9, geographic area information in this embodiment of this application may include a first longitude value 630 and a first distance H1. A terminal device may determine a geographic area 660 based on signal coverage of a network device 610, the first longitude value 630, and the first distance H1.

The terminal device 620 may determine target geographic area information based on a geographic location at which the terminal device 620 is located and M pieces of geographic area information, where the target geographic area information indicates the geographic area 660. The terminal device 620 determines, from N pieces of access control information, based on the target geographic area information, target access control information corresponding to the target geographic area information. If the current geographic location of the terminal device 620 is included in the geographic area 660, the terminal device 620 selects, as the target access control information, first access control information corresponding to the target geographic area information indicating the geographic area 660, and determines, based on the target access control information, whether an access request message can be sent to the network device 610. If the geographic location of the terminal device 620 is not included in the geographic area 660, a possible case is that a message sent by the terminal device 610 further includes second access control information, and the second access control information corresponds to a geographic area other than the geographic area 660. The second access control information allows the terminal device 620 to send the access request message to the network device 610, or prohibits the terminal device 620 from sending the access request message to the network device 610.

Optionally, in this embodiment of this application, the geographic area information may further include a second longitude value 640 and a second distance H2, and the terminal device may determine a geographic area 670 based on the signal coverage of the network device 610, the second longitude value 640, and the second distance H2. The geographic area 670 may be associated with the second access control information. In this case, the terminal device 620 in the geographic area 660 may select the first access control information as the target access control information, and a terminal device 621 in the geographic area 670 may select the second access control information as the target access control information, and determines, based on a target access information set, whether the access request message can be sent to the network device 610.

Optionally, the geographic area 670 may alternatively be associated with the first access control information. In this case, both the terminal device 620 in the geographic area 660 and the terminal device 621 in the geographic area 670 may determine, based on the first access control information, whether the access request message can be sent to the network device 610.

In a possible implementation, if the geographic location of the terminal device 620 is neither included in the geographic area 660 nor included in the geographic area 670, a possible case is that a message sent by the network device 610 to the terminal device further includes third access control information. If the third access control information corresponds to a geographic area other than the geographic areas 660 and 670, the third access control information indicates that the terminal device 620 can send the access request message to the network device 610. Another possible case is that the network device 610 allows or prohibits, by default, the terminal device to send or from sending the access request message to the network device 610 if the location of the terminal device does not exist in the M pieces of geographic area information.

In another possible implementation, the terminal device 620 in the geographic area 660 may determine, based on the first access control information, whether the access request message can be sent to the network device 610. The second access control information corresponding to the geographic area 670 is specific access control information, and the specific access control information indicates that the terminal device 621 in the geographic area 670 is prohibited from sending the access request message to the network device 610.

Figure 10:
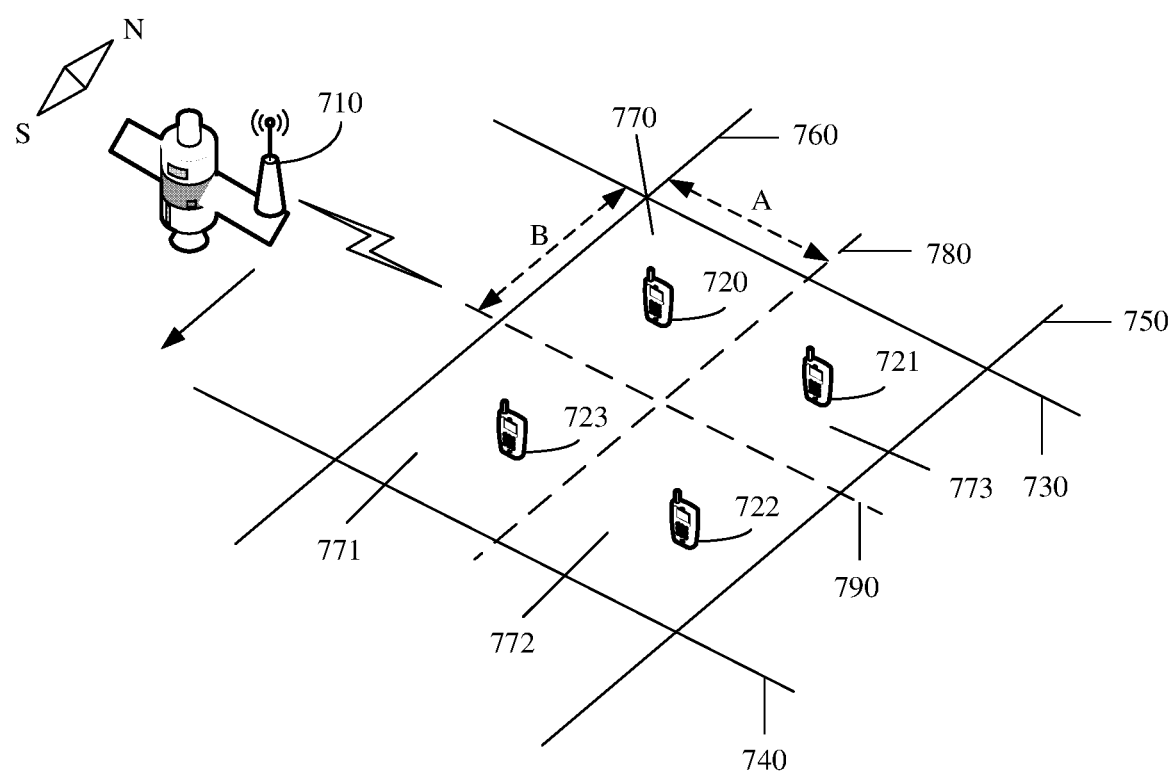
FIG. 10 is a schematic diagram of determining geographic area information according to an embodiment of this application.

FIG. 10 is another schematic diagram of determining geographic area information according to an embodiment of this application. As shown in FIG. 10, the geographic area information in this embodiment of this application may include a first latitude value 730, a second latitude value 740, a first longitude value 750, and a second longitude value 760. A terminal device may determine a geographic area based on the first latitude value 730, the second latitude value 740, the first longitude value 750, and the second longitude value 760.

The terminal device 720 may determine target access control information based on a geographic location at which the terminal device 720 is located. If the geographic location of the terminal device 720 is included in the geographic area, the terminal device 720 selects first access control information corresponding to the geographic area, and determines, based on the first access control information, whether the access request message can be sent. If the geographic location of the terminal device 720 is not included in the geographic area, the terminal device 720 can send the access request message to the network device 710, or the terminal device 720 cannot send the access request message to the network device 710.

In a possible implementation, FIG. 10 may further include a third longitude value 780 and a third latitude value 790. The terminal device may determine geographic areas 770, 771, 772, and 773 based on the first latitude value 730 and the second latitude value 740, the first longitude value 750 and the second longitude value 760, and the third longitude value 780 and the third latitude value 790. The geographic area 770 may be associated with the first access control information, and the terminal device 720 located in the geographic area 770 may determine, based on the first access control information, whether to send the access request message to the network device 710. The geographic area 771 may be associated with second access control information, and a terminal device 721 located in the geographic area 771 may determine, based on the second access control information, whether to send the access request message to the network device 710. The geographic area 772 may be associated with third access control information, and a terminal device 722 located in the geographic area 772 may determine, based on the third access control information, whether to send the access request message to the network device 710. The geographic area 773 may be associated with fourth access control information, and a terminal device 723 located in the geographic area 773 may determine, based on the fourth access control information, whether to send the access request message to the network device 710.

In another possible implementation, FIG. 10 may further include a first longitude distance A and a first latitude distance B. The network device 710 may determine the geographic areas 770, 771, 772, and 773 based on the first latitude value 730, the second latitude value 740, the first latitude distance B, the first longitude value 750, the second longitude value 760, and the first longitude distance A.

Optionally, the first access control information, the second access control information, the third access control information, and the fourth access control information may be the same, or may be different. This is not limited.

For example, the first access control information, the second access control information, the third access control information, and the fourth access control information are different access control information. Alternatively, one of the first access control information, the second access control information, the third access control information, and the fourth access control information is access control information that has a specific indication function, and indicates that a terminal device in a geographic area corresponding to the access control information can send the access request message or is prohibited from sending the access request message.

Optionally, if the terminal device determines that the geographic location of the terminal device is not included in the geographic areas 770, 771, 772, and 773, a possible case is that a message sent by the network device 710 to the terminal device includes fifth access control information. The fifth access control information corresponds to a geographic area other than the geographic areas 770, 771, 772, and 773. In this case, the terminal device can send the access request message to the network device 710, or the terminal device cannot send the access request message to the network device 710. Another possible case is that the network device 710 allows or prohibits, by default, the terminal device to send or from sending the access request message if the location of the terminal device is not included in the geographic area information.

It should be understood that FIG. 10 is merely a schematic diagram of this embodiment of this application, and should not constitute any limitation on this application.

Figure 11:
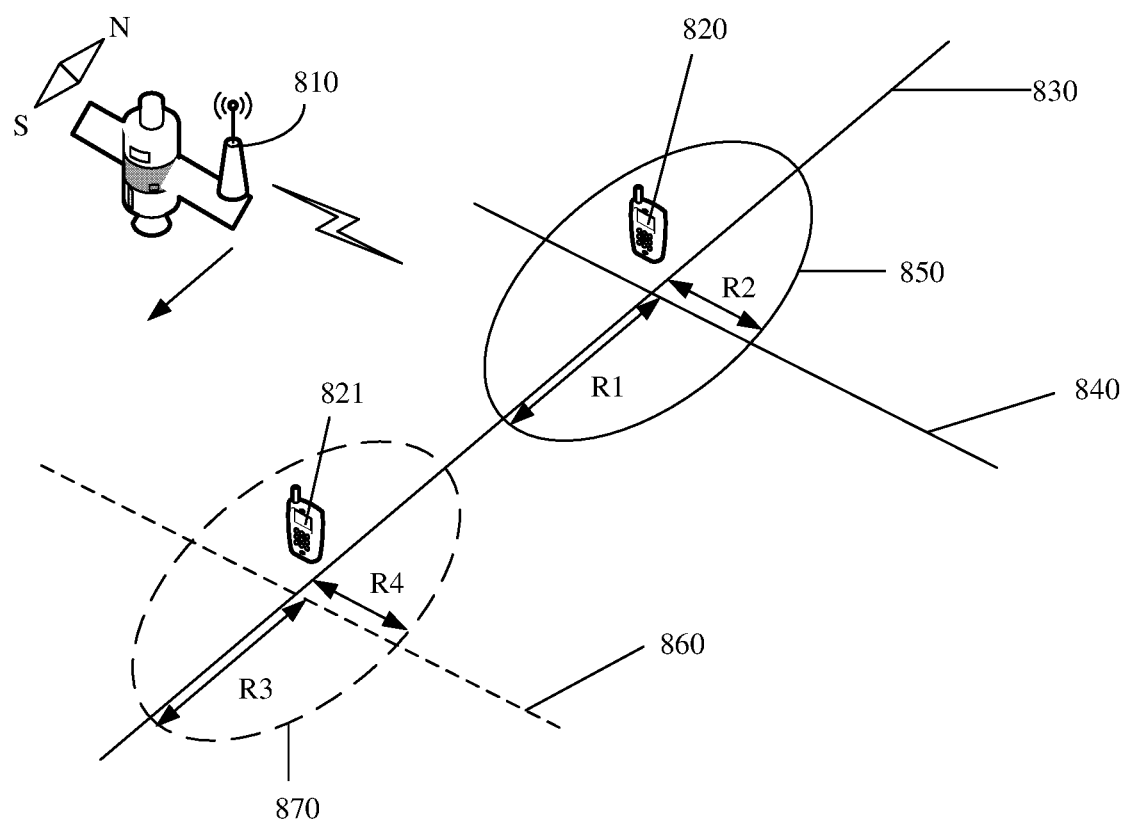
FIG. 11 is another schematic diagram of determining geographic area information according to an embodiment of this application.

FIG. 11 is a schematic diagram of determining geographic area information according to an embodiment of this application. As shown in FIG. 1i, the geographic area information in this embodiment of this application may include a first longitude value 830, a first latitude value 840, and a first radius R1. A terminal device may determine a geographic area 850 based on the first longitude value 830, the first latitude value 840, and the first radius R1, namely, a circular region centered around an intersection point of the first longitude value 830 and the first latitude value 840 with the first radius R1.

Optionally, one piece of M pieces of geographic area information may further include the first longitude value 830, the first latitude value 840, the first radius R1, and a second radius R2. In this case, the geographic area 850 is elliptical.

The terminal device 820 may determine target access control information based on a geographic location at which the terminal device 820 is located. If the terminal device 820 determines that the geographic location at which the terminal device 820 is located is included in the geographic area 850, the terminal device 820 selects first access control information corresponding to the geographic area 850, and determines, based on the first access control information, whether an access request message can be sent to a network device.

Optionally, the geographic area information in this embodiment of this application may further include a second latitude value 860 and a third radius R3. In this case, if the third radius R3 is centered around an intersection point of the first longitude value 830 and a second latitude value 860, the geographic area 870 is in a circular shape.

Optionally, the geographic area information in this embodiment of this application may further include a fourth radius R4. In this case, the geographic area 870 is in an ellipse shape.

It should be understood that the first radius R1 may be the same as or different from the third radius R3, and the second radius R2 may be the same as or different from the fourth radius R4. This is not specifically limited in this embodiment of this application.

It should be understood that, for a correspondence manner between the geographic area information and the access control information, and an access control manner in this embodiment of this application, refer to the foregoing descriptions. For brevity, details are not described again.

Optionally, in this embodiment of this application, a second longitude value and a fifth radius; or a second longitude value, a fifth radius, and a sixth radius may be further included. If the fifth radius is centered around an intersection point of the second longitude value and the first latitude value, the geographic area is in a circular shape. When the sixth radius exists, the sixth radius and the fifth radius are radiuses of an ellipse centered at an intersection point of the second longitude value and the first latitude value.

It should be understood that, for a correspondence between the geographic area information and the access control information and an access control manner of the terminal device in this embodiment of this application, refer to the foregoing descriptions. For brevity, details are not described again.

It should be understood that the geographic area 850 and the geographic area 870 in this embodiment of this application may be adjacent to each other, or may be separated by a distance. This is not specifically limited in this embodiment of this application.

Figure 12:
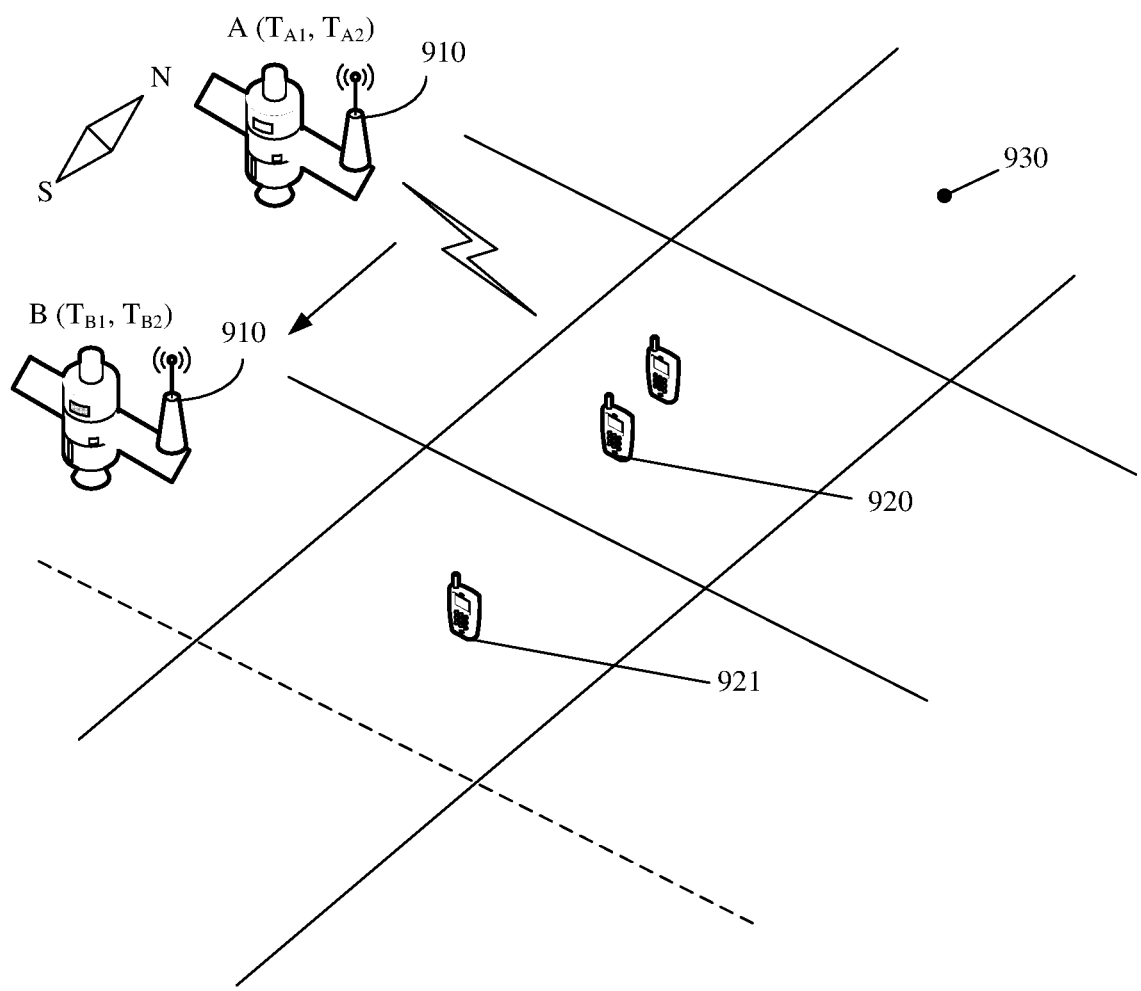
FIG. 12 is a schematic diagram of determining time information according to an embodiment of this application.

FIG. 12 is a schematic diagram of determining time information according to an embodiment of this application. As shown in FIG. 12, the time information in this embodiment of this application may include at least one moment, and the at least one moment indicates at least one time period. In this embodiment of this application, current time information may also be referred to as target time information. This is not limited.

For example, as shown in FIG. 12, a network device 910 broadcasts a reference point 930, and that a time point of the reference point 930 is 0 is defined. Access control information A is associated with a moment TA1 and a moment TA2, and access control information B is associated with a moment TB1 and a moment TB2. If a time point (namely, a current time point) of a terminal device relative to a reference point is between the moment TA1 and the moment TA2, it is determined that duration indicated by M pieces of time information includes the current time point. In this case, the terminal device selects the access control information A, determines that the access control information A is target access control information, and determines, based on the access control information A, whether an access request message can be sent to the network device 910. If the time point of the reference point of relative to the terminal device is between the moment TB1 and the moment TB2, it is determined that the duration indicated by the M pieces of time information includes the current time point. In this case, the terminal device selects the access control information B, determines that the access control information B is the target access control information, and determines, based on the access control information B, whether the access request message can be sent to the network device 910. If the time point of the reference point of relative to the terminal device is neither between the moment TA1 and the moment TA2, nor between the moment TB1 and the moment TB2, nor in duration indicated by other time information, it is determined that the duration indicated by the M pieces of time information does not include the current time point. In this case, the terminal device determines that the corresponding target access control information does not exist. In this case, the terminal device determines that the terminal device can send the access request message to the network device 910, or the terminal device determines that the terminal device is prohibited from sending the access request message to the network device 910.

Optionally, the moment TA2 may be determined based on the moment TA1 and duration t1, and the moment TB2 may be determined based on the moment TB1 and duration t2. In this case, if the time point of the terminal device relative to the reference point is between TA1 and TA1+t1, it is determined that the duration indicated by the M pieces of time information includes the current time point. In this case, the terminal device selects the access control information A, determines that the access control information A is the target access control information, and determines, based on the access control information A, whether the access request message can be sent to the network device 910. If the time point of the reference point relative to the terminal device is between TB1 and TB1+t2, it is determined that the duration indicated by the M pieces of time information includes the current time point. In this case, the terminal device selects the access control information B, determines that the access control information B is the target access control information, and determines, based on the access control information B, whether the access request message can be sent to the network device 910. If the time point of the terminal device relative to the reference point is neither between TA1 and TA1+t1 nor between TB1 and TB1+t2, it is determined that the duration indicated by the M pieces of time information does not include the current time point. In this case, the terminal device determines that the corresponding target access control information does not exist. In this case, the terminal device determines that the terminal device can send the access request message to the network device 910, or the terminal device determines that the terminal device is prohibited from sending the access request message to the network device 910.

Optionally, in the technical solution, the moment TA2 and the moment TB2 may not be included. In this case, if the time point of the terminal device relative to the reference point is between the moment TA1 and the moment TB2, it is determined that the M pieces of time information include the current time information. In this case, the terminal device selects the access control information A, determines that the access control information A is the target access control information, and determines, based on the access control information A, whether the access request message can be sent to the network device 910. If the time point of the reference point relative to the terminal device is greater than the moment TB2, it is determined that current time information exists in the M pieces of time information. In this case, the terminal device selects the access control information B, determines that the access control information B is the target access control information, and determines, based on the access control information B, whether the access request message can be sent to the network device 910.

The terminal device may determine the current time point based on a geographic location at which the terminal device is located, a geographic location of the reference point 930, and a running speed of the network device 910. For example, the terminal device determines a distance between the terminal device and the reference point 930 based on the geographic location of the reference point 930 and the geographic location at which the terminal device is located, and then determines a relative time point of the terminal device relative to the reference point 910, namely, the current time point, by dividing the distance by the running speed of the network device 910.

Alternatively, the terminal device directly receives first time information sent by the network device 910, where the first time information indicates the time point of the network device 910 relative to the reference point 930.

Figure 13:
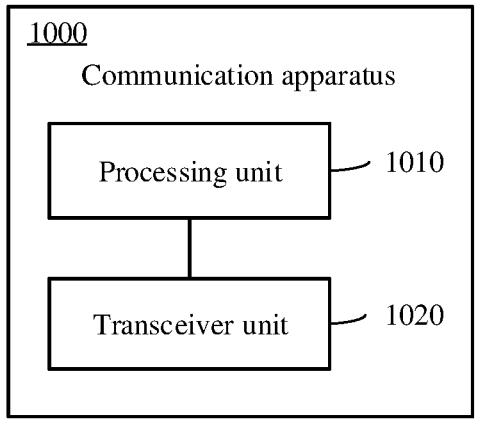
FIG. 13 is a schematic block diagram of a communication apparatus according to an embodiment of this application.

FIG. 13 is a schematic block diagram of a communication apparatus according to an embodiment of this application. As shown in FIG. 13, the communication apparatus woo includes a processing unit 1010 and a transceiver unit 1020.

The processing unit low is configured to determine a first message, where the first message indicates a correspondence between N pieces of access control information and M pieces of geographic area information, the access control information is used by a terminal device to determine whether to send an access request message, and N and M are positive integers. The transceiver unit is configured to send the first message to the terminal device.

Optionally, the first message includes configuration information of the N pieces of access control information and configuration information of the M pieces of geographic area information; or the first message includes N access control information indexes and M geographic area information indexes. The N access control information indexes one-to-one correspond to the N pieces of access control information, and the M geographic area information indexes one-to-one correspond to the M pieces of geographic area information.

Optionally, before sending the first message to the terminal device, the transceiver unit 1020 is further configured to send a second message to the terminal device. The second message is for configuring the N pieces of access control information and the M pieces of geographic area information, and/or the second message includes N access control information indexes and M geographic area information indexes, and the N access control information indexes one-to-one correspond to the N pieces of access control information, and the M geographic area information indexes one-to-one correspond to the M pieces of geographic area information.

Optionally, the geographic area information includes a first latitude and a second latitude; a first longitude and a second longitude; a first latitude, a second latitude, a first longitude, and a second longitude; a first longitude and a first distance; or a first latitude and a second distance.

Optionally, the geographic area information includes a third latitude, a third longitude, and a first radius, where the first radius is centered around an intersection point of the third latitude and the third longitude.

Optionally, the geographic area information indicates at least one cell.

Figure 14:
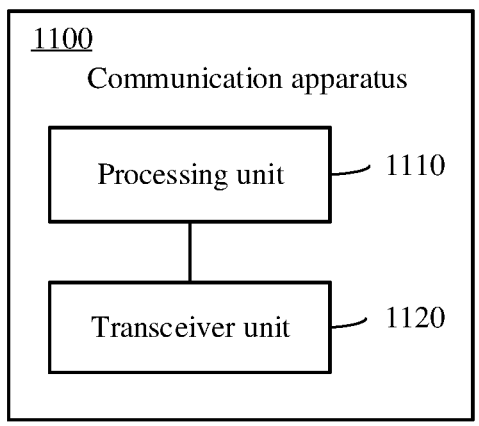
FIG. 14 is another schematic block diagram of a communication apparatus according to an embodiment of this application.

FIG. 14 is a schematic block diagram of a communication apparatus according to an embodiment of this application. As shown in FIG. 14, the communication apparatus 1100 includes a processing unit 1110 and a transceiver unit 1120.

The processing unit 1110 is configured to determine a third message, where the third message indicates a correspondence between N pieces of access control information and M pieces of time information, the access control information is used by a terminal device to determine whether to send an access request message, and N and M are positive integers. The transceiver unit 1120 is configured to send the third message to the terminal device.

Optionally, the third message includes configuration information of the N pieces of access control information and configuration information of the M pieces of time information; or the third message includes N access control information indexes and M time information indexes. The N access control information indexes one-to-one correspond to the N pieces of access control information, and the M time information indexes one-to-one correspond to the M pieces of time information.

Optionally, before sending the third message to the terminal device, the transceiver unit 1120 is further configured to send a fourth message to the terminal device. The fourth message is for configuring the N pieces of access control information and the M pieces of geographic area information, and/or the fourth message includes N access control information indexes and M time information indexes, and the N access control information indexes one-to-one correspond to the N pieces of access control information, and the M time information indexes one-to-one correspond to the M pieces of time information.

Optionally, the time information includes at least one moment, and the at least one moment indicates at least one time period; or the time information includes a first moment and first duration.

Optionally, the transceiver unit 1120 is further configured to: send reference information to the terminal device, where the reference information is for determining current time information; or send first time information to the terminal device, where the first time information indicates current time information.

Figure 15:
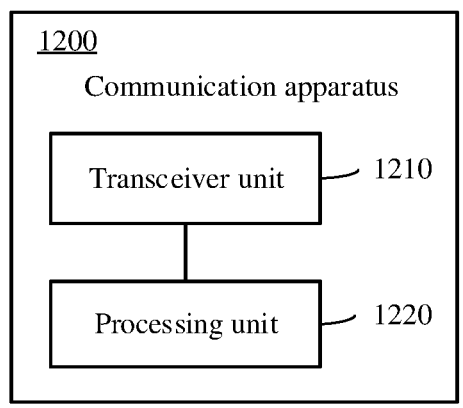
FIG. 15 is a schematic block diagram of a communication apparatus according to an embodiment of this application.

FIG. 15 is a schematic block diagram of a communication apparatus according to an embodiment of this application. As shown in FIG. 15, the apparatus 1200 includes a transceiver unit 1210 and a processing unit 1220.

The transceiver unit 1210 is configured to receive a first message, where the first message indicates a correspondence between N pieces of access control information and M pieces of geographic area information, the access control information is used by a terminal device to determine whether to send an access request message, and N and M are positive integers. The processing unit 1220 is configured to determine, based on a current geographic location and the first message, whether to send a first access request message.

Optionally, the first message includes configuration information of the N pieces of access control information and configuration information of M pieces of geographic area information; or the first message includes N access control information indexes and M geographic area information indexes. The N access control information indexes one-to-one correspond to the N pieces of access control information, and the M geographic area information indexes one-to-one correspond to the M pieces of geographic area information.

Optionally, before receiving the first message, the transceiver unit 1210 is further configured to receive a second message. The second message is for configuring the N pieces of access control information and the M pieces of geographic area information, and/or the second message includes N access control information indexes and M geographic area information indexes, and the N access control information indexes one-to-one correspond to the N pieces of access control information, and the M geographic area information indexes one-to-one correspond to the M pieces of geographic area information.

Optionally, the processing unit 1220 is further configured to determine, based on the current geographic location, whether target geographic area information exists in the M pieces of geographic area information.

Optionally, the processing unit 1220 is specifically configured to: determine, based on the target geographic area information and the first message, target access control information corresponding to the target geographic area information, and determine, based on the target access control information, whether to send the first access request message.

Optionally, the processing unit 1220 is specifically configured to: if a geographic location of the terminal device does not exist in a geographic area indicated by the M pieces of geographic area information, determine to send the first access request message.

Optionally, the geographic area information includes a first latitude and a second latitude; a first longitude and a second longitude; a first latitude, a second latitude, a first longitude, and a second longitude; a first longitude and a first distance; or a first latitude and a second distance.

Optionally, the geographic area information includes a third latitude, a third longitude, and a first radius, where the first radius is centered around an intersection point of the third latitude and the third longitude.

Optionally, the geographic area information indicates at least one cell.

Figure 16:
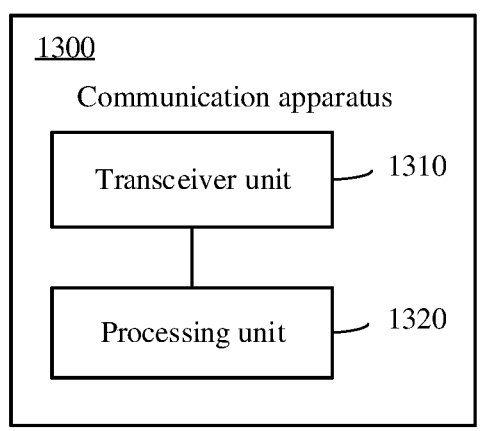
FIG. 16 is another schematic block diagram of a communication apparatus according to an embodiment of this application.

FIG. 16 is a schematic block diagram of a communication apparatus according to an embodiment of this application.

As shown in FIG. 16, the apparatus 1300 includes a transceiver unit 1310 and a processing unit 1320.

The transceiver unit 1310 is configured to receive a third message, where the third message indicates a correspondence between N pieces of access control information and M pieces of time information, the access control information is used by a terminal device to determine whether to send an access request message, and N and M are positive integers. The processing unit 1320 is configured to determine, based on a current time point and the third message, whether to send a second access request message.

Optionally, the third message includes configuration information of the N pieces of access control information and configuration information of the M pieces of time information; or the third message includes N access control information indexes and M time information indexes. The N access control information indexes one-to-one correspond to the N pieces of access control information, and the M time information indexes one-to-one correspond to the M pieces of time information.

Optionally, before receiving the third message, the transceiver unit 1310 is further configured to receive a fourth message. The fourth message is for configuring the N pieces of access control information and the M pieces of time information, and/or the fourth message includes N access control information indexes and M time information indexes, and the N access control information indexes one-to-one correspond to the N pieces of access control information, and the M time information indexes one-to-one correspond to the M pieces of time information.

Optionally, the processing unit 1320 is further configured to determine, based on the current time point, whether current time information exists in the M pieces of time information.

Optionally, the processing unit 1320 is specifically configured to: determine, based on the current time information and the third message, target access control information corresponding to the current time information; and determine, based on the target access control information, whether to send the second access request message.

Optionally, the processing unit 1320 is specifically configured to: if a time point of the terminal device does not exist in duration indicated by the M pieces of time information, determine to send the second access request message.

Optionally, the time information includes at least one moment, and the at least one moment indicates at least one time period; or the time information includes a first moment and first duration.

Optionally, the transceiver unit 1310 is further configured to: receive reference information, where the reference information is for determining the current time information; or receive first time information, where the first time information indicates the current time information.

Embodiments of this application further provide a network device, including a processor, a memory, and instructions that are stored in the memory and that can be run on the processor. When the instructions are run, the network device is enabled to perform the method in embodiments of this application.

Embodiments of this application further provide a terminal device, including a processor, a memory, and instructions that are stored in the memory and that can be run on the processor. When the instructions are run, the terminal device is enabled to perform the method in embodiments of this application.

Embodiments of this application further provide a communication apparatus. The communication apparatus includes at least one processor and a communication interface. The communication interface is connected to the at least one processor. The communication interface is configured to obtain a program or instructions. When the program or the instructions is/are executed by the processor, the communication method according to any one of embodiments of this application is implemented.

Optionally, the communication apparatus may further include a memory, and the memory communicates with the processor and the communication interface via an internal connection path. The memory is configured to store the instructions, and the processor may execute the instructions stored in the memory.

In a possible implementation, the communication apparatus is configured to implement procedures and steps corresponding to the network device in the foregoing method embodiments.

In another possible implementation, the communication apparatus is configured to implement procedures and steps corresponding to the terminal device in the foregoing method embodiments.

Embodiments of this application further provide a chip, including a processor, configured to invoke a computer program from a memory and run the computer program, so that a device on which the chip is installed performs the method in embodiments of this application.

Embodiments of this application further provide a computer-readable storage medium, configured to store a computer program. The computer program enables a computer to perform the method in embodiments of this application.

Embodiments of this application further provide a communication system, including the network device and the terminal device described above. The network device and the terminal device are configured to perform the method in embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a terminal device, a first message, wherein the first message indicates a correspondence between N pieces of access control information of a network and M pieces of geographic area information, the N pieces of access control information being for determining accessing the network, and N and M being positive integers; and
determining, by the terminal device based on a current geographic location of the terminal device and the correspondence indicated by the first message, whether to send a first access request message to the network.

2. The method according to claim 1, wherein the first message comprises configuration information of the N pieces of access control information and configuration information of the M pieces of geographic area information; or
the first message comprises N access control information indexes and M geographic area information indexes, wherein the N access control information indexes one-to-one correspond to the N pieces of access control information, and the M geographic area information indexes one-to-one correspond to the M pieces of geographic area information.

3. The method according to claim 1, wherein before receiving the first message, the method further comprises:
receiving, by the terminal device, a second message, wherein the second message is for configuring the N pieces of access control information and the M pieces of geographic area information, or
the second message comprises N access control information indexes and M geographic area information indexes, wherein the N access control information indexes one-to-one correspond to the N pieces of access control information, and the M geographic area information indexes one-to-one correspond to the M pieces of geographic area information.

4. The method according to claim 1, wherein the method further comprises:
determining, based on the current geographic location, whether target geographic area information exists in the M pieces of geographic area information.

5. The method according to claim 4, wherein determining, based on the current geographic location and the correspondence, whether to send the first access request message comprises:
determining, by the terminal device based on the target geographic area information and the correspondence, target access control information, in the N pieces of access control information, corresponding to the target geographic area information; and
determining, by the terminal device based on the target access control information, whether to send the first access request message.

6. The method according to claim 1, wherein determining, based on the current geographic location and the correspondence, whether to send the first access request message comprises:
when a geographic location of the terminal device does not exist in a geographic area indicated by the M pieces of geographic area information, determining, by the terminal device, to send the first access request message.

7. The method according to claim 1, wherein a piece of the M pieces of geographic area information comprises:
a first latitude and a second latitude;
a first longitude and a second longitude;
a first latitude, a second latitude, a first longitude, and a second longitude;
a first longitude and a first distance; or
a first latitude and a second distance.

8. The method according to claim 1, wherein a piece of the M pieces of geographic area information comprises a third latitude, a third longitude and a first radius, and the first radius is centered around an intersection point of the third latitude and the third longitude.

9. The method according to claim 1, wherein the M pieces of geographic area information indicates at least one cell.

10. A communication method, comprising:
receiving, by a terminal device, a third message, wherein the third message indicates a correspondence between N pieces of access control information of a network and M pieces of time information, the N pieces of access control information being for determining accessing the network, and N and M being positive integers; and
determining, by the terminal device based on a current time point and the correspondence indicated by the third message, whether to send a second access request message to the network.

11. The method according to claim 10, wherein the third message comprises configuration information of the N pieces of access control information and configuration information of the M pieces of time information; or the third message comprises N access control information indexes and M time information indexes, wherein the N access control information indexes one-to-one correspond to the N pieces of access control information, and the M time information indexes one-to-one correspond to the M pieces of time information.

12. The method according to claim 10, wherein before receiving the third message, the method further comprises:
receiving, by the terminal device, a fourth message, wherein
the fourth message is for configuring the N pieces of access control information and the M pieces of time information, or
the fourth message comprises N access control information indexes and M time information indexes, wherein the N access control information indexes one-to-one correspond to the N pieces of access control information, and the M time information indexes one-to-one correspond to the M pieces of time information.

13. The method according to claim 10, wherein the method further comprises:
determining, by the terminal device based on the current time point, whether current time information exists in the M pieces of time information.

14. The method according to claim 13, wherein determining, based on the current time point and the correspondence, whether to send the second access request message comprises:
determining, by the terminal device based on the current time information and the correspondence, target access control information, in the N pieces of access control information, corresponding to the current time information; and
determining, by the terminal device based on the target access control information, whether to send the second access request message.

15. The method according to claim 10, wherein determining, based on the current time point and the correspondence, whether to send the second access request message comprises:
when a time point of the terminal device does not exist in duration indicated by the M pieces of time information, determining, by the terminal device, to send the second access request message.

16. The method according to claim 10, wherein a piece of the M pieces of time information comprises at least one moment, and the at least one moment indicates at least one time period; or
the piece of the M pieces of time information comprises a first moment and first duration.

17. The method according to claim 10, wherein the method further comprises:
receiving, by the terminal device, reference information to determine current time information; or
receiving, by the terminal device, first time information, wherein the first time information indicates the current time information.

18. A communication apparatus, comprising at least one processor and a communication interface, wherein the communication interface is connected to the at least one processor, and the communication interface is configured to obtain a program or instructions; and when the program or the instructions are executed by the processor, the communication apparatus is caused to perform:
receiving a first message, wherein the first message indicates a correspondence between N pieces of access control information of a network and M pieces of geographic area information, the N pieces of access control information being for determining accessing the network, and N and M being positive integers; and
determining, based on a current geographic location of the communication apparatus and the correspondence indicated by the first message, whether to send a first access request message to the network.

19. The communication apparatus according to claim 18, wherein the first message comprises configuration information of the N pieces of access control information and configuration information of the M pieces of geographic area information; or
the first message comprises N access control information indexes and M geographic area information indexes, wherein the N access control information indexes one-to-one correspond to the N pieces of access control information, and the M geographic area information indexes one-to-one correspond to the M pieces of geographic area information.

20. The communication apparatus according to claim 18, wherein before receiving the first message, the communication apparatus is further caused to perform:
receiving a second message, wherein
the second message is for configuring the N pieces of access control information and the M pieces of geographic area information, or
the second message comprises N access control information indexes and M geographic area information indexes, wherein the N access control information indexes one-to-one correspond to the N pieces of access control information, and the M geographic area information indexes one-to-one correspond to the M pieces of geographic area information.

* * * * *